United States Patent

Oshima et al.

[11] Patent Number: 5,606,494
[45] Date of Patent: Feb. 25, 1997

[54] SWITCHING APPARATUS

[75] Inventors: Jun Oshima, Akigawa; Emiko Morooka, Fuchu; Yoshio Kawai, Higashiyamato; Kaoru Yoshida, Ome, all of Japan

[73] Assignee: Casio Computer Co., Ltd., Tokyo, Japan

[21] Appl. No.: 342,714

[22] Filed: Nov. 21, 1994

[30] Foreign Application Priority Data

Nov. 25, 1993 [JP] Japan .................................. 5-295067
Dec. 22, 1993 [JP] Japan .................................. 5-325338

[51] Int. Cl.$^6$ .............................. G03B 19/18; A63F 9/22
[52] U.S. Cl. .................... 364/167.01; 364/188; 345/158; 446/175
[58] Field of Search .......................... 364/167.01, 188, 364/424.01, 424.02, 516, 560, 561; 395/93, 99; 318/568.16; 901/3, 9, 47; 345/156, 158; 434/1; 446/175; 273/433, 434, 438, 439

[56] References Cited

U.S. PATENT DOCUMENTS

| | | | |
|---|---|---|---|
| 4,545,106 | 10/1985 | Juengel | 29/563 |
| 4,649,504 | 3/1987 | Krouglicof et al. | 364/559 |
| 4,729,563 | 3/1988 | Yokoi | 273/1 E |
| 4,768,088 | 8/1988 | Ando | 358/93 |
| 4,802,879 | 2/1989 | Rissmore et al. | 446/175 |
| 4,815,733 | 3/1989 | Yokoi | 273/1 E |
| 4,843,639 | 6/1989 | Beals | 455/603 |
| 4,920,520 | 4/1990 | Göbel et al. | 367/99 |
| 4,988,981 | 1/1991 | Zimmerman et al. | 345/158 |
| 5,066,902 | 11/1991 | Watanabe | 318/568.16 |
| 5,107,449 | 4/1992 | Ikuta | 364/561 |
| 5,150,310 | 9/1992 | Greenspun et al. | 364/516 |
| 5,163,234 | 11/1992 | Tsukamoto et al. | 34/44 |
| 5,369,347 | 1/1994 | Yoo | 318/568.12 |
| 5,446,445 | 8/1995 | Bloomfield et al. | 340/521 |

FOREIGN PATENT DOCUMENTS 5-73531  3/1993  Japan .

OTHER PUBLICATIONS

Weiner et al, "A Computer Animation Movie Language for Educational Motion Pictures", Proceedings of the Fall Joint Computer Conference, 1968, San Francisco.

Girard et al, "Interactive Design of 3D Computer–Animated Legged Animal Motion", IEEE Computer Graphics and Applications, 1987, New York.

Primary Examiner—Paul P. Gordon
Attorney, Agent, or Firm—Frishauf, Holtz, Goodman, Langer & Chick

[57] ABSTRACT

A switching apparatus is operated by a non contact motion made by a user. The switching apparatus is effectively used to control a mechanism, particularly a mechanism for driving a robot, by the non contact motion or gesture made by the user without touching the switching apparatus itself. The user can control or move indications, for example views of a dog, displayed on an image displaying equipment provided with the switching apparatus by his (her) motion or gesture without touching the switching apparatus. Therefore, the user can enjoy feeling as if he actually orders his dog.

16 Claims, 21 Drawing Sheets

FIG.6
| M | DISPLAY DATA | | EFFECT SOUND DATA |
|---|---|---|---|
| | (1) | (2) | |
| M=0 | 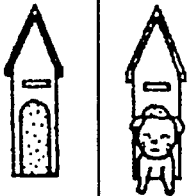 |  | |
| | (1) | (2) | |
| M=1 | 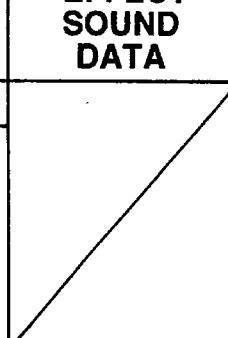 | 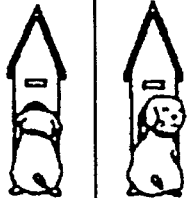 | Uuh |
| | (1) | (2) | |
| M=2 |  | 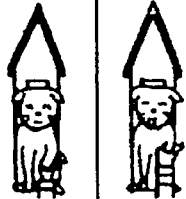 | Bow wow |
| | (1) | (2) | |
| M=3 |  | 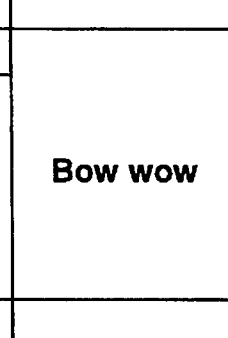 | Kuh |
| COUNTER | DISTANCE | | |
33 ROM
33a

FIG.16

33 ROM

| M | DISPLAY DATA |
|---|---|
| M=0 | (1) (2) |
| M=1 | (1) (2) (3) (4) (5) (6) (7) (8) (9) (10) (11) |
| M=2 | (1) (2) (3) (4) (5) (6) (7) (8) (9) |
| M=3 | (1) (2) (3) (4) (5) (6) (7) |

FIG.22
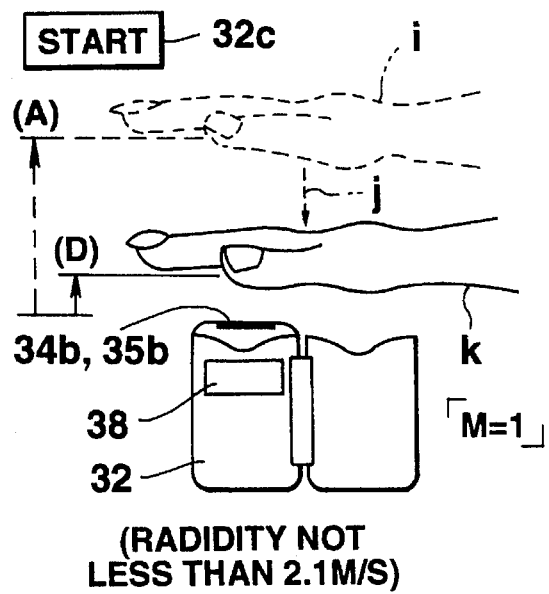
(RADIDITY NOT LESS THAN 2.1M/S)
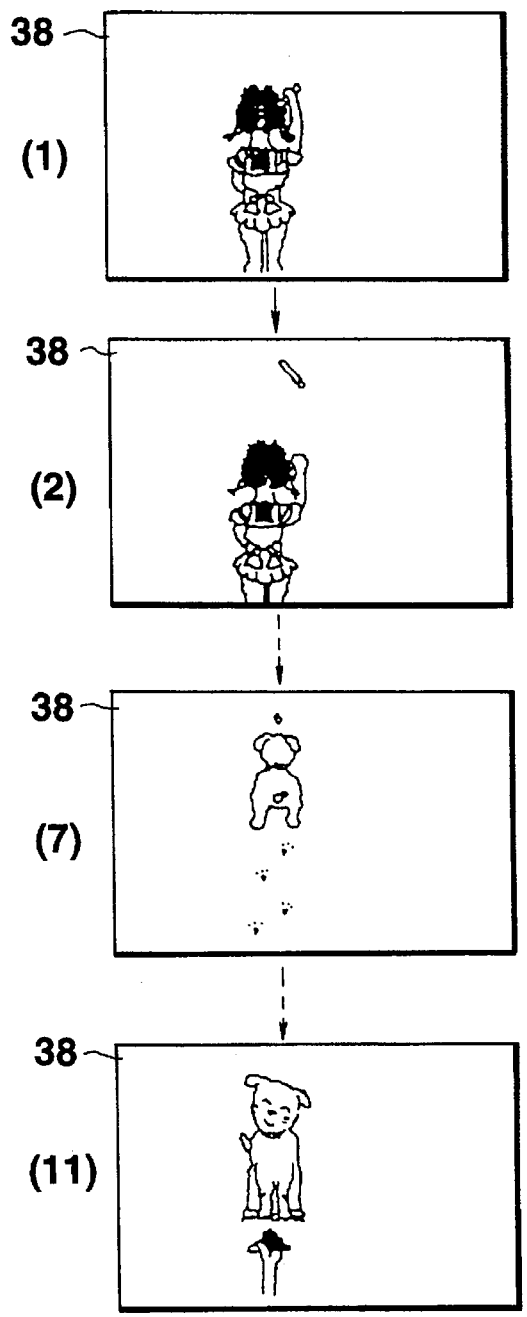

SWITCHING APPARATUS

BACKGROUND OF THE INVENTION

1. Field of the Invention

The present invention relates to an electronic apparatus to be employed in electronic appliances such as electronic game machines for driving a display unit or a mechanical driving unit following an instruction of a user, and in particular relates to an electronic apparatus that is capable of operating the display unit or the mechanical driving unit without requiring the user to touch the electronic apparatus itself.

2. Description of Related Art

In conventional electronic game machines and other electronic appliances, keys provided thereon are operated by a user to drive a display unit or a mechanical driving unit, or keys provided on a remote control device are operated by the user to drive the display unit or the mechanical driving unit.

More specifically, when a character or a robot with a mechanical driving unit, which is displayed on the display unit, is moved on the display unit, the user is required to selectively operate direction changing keys to move the character or the robot rightwards or leftwards.

In the conventional electronic game machines or other electronic appliances, however, the user performs a simple mechanical operation, depressing corresponding keys to move or change the character or robot displayed on the display unit as desired. The simple mechanical operation gives a quite different feeling from that as the user actually gives an instruction, for example, to his dog. Therefore, the user cannot enjoy the feeling as he gives an instruction to his dog. Further, the conventional electronic game machines or other electronic appliances have to be provided with a key input unit and a remote control device.

SUMMARY OF THE INVENTION

The present invention has been made to overcome the above prior art drawbacks, and has an object to provide an electronic apparatus that is capable of moving and changing a character displayed on a display unit or a mechanical driving unit in response to a motion or gesture made by a user without performing a mechanical operation such as a key input operation.

According to one aspect of the invention, there is provided a switching apparatus for controlling mechanism, which comprises:

driving means for driving said mechanism;

non-contact switching means for performing a switching operation in response to non-contact motion made by a user; and control means for controlling said driving means to drive said mechanism based on the switching operation of said non-contact switching means.

With the above structure of the switching apparatus, a character displayed on a display unit can be moved or changed on the display unit or a mechanical driving unit can be operated, as desired by the user without operation of a key input unit. Therefore, the switching apparatus eliminates a key input unit from the conventional electronic appliances.

BRIEF DESCRIPTION OF THE DRAWINGS

Other objects and structures of the present invention will be more fully understood from the description, when taken with the accompanying drawings, in which:

FIG. 6 is a view illustrating image data (views of a dog) to be displayed and effect sound data, which are previously stored in ROM of the electronic notebook;

FIG. 16 is a view illustrating image data (views of a girl and a dog) to be displayed, which are previously stored in ROM of an electronic note book that is installed with a second switching apparatus according to a second embodiment of the present invention;

FIG. 22 is a view illustrating a character (a girl and a dog) displayed when the non-contact operation is performed at a moving rapidity of not less than 2.0 m/s in the image display mode of the electronic note book with the second switching apparatus.

It would be apparent to those skilled in the art from the following description of preferred embodiments that the present invention may be modified in various manners and may be applicable to other appliances.

DETAILED DESCRIPTION OF PREFERRED EMBODIMENTS

Now, preferred embodiments of the present invention will be described in detail with reference to the accompanying drawings.

FIRST EMBODIMENT

Figure 1:
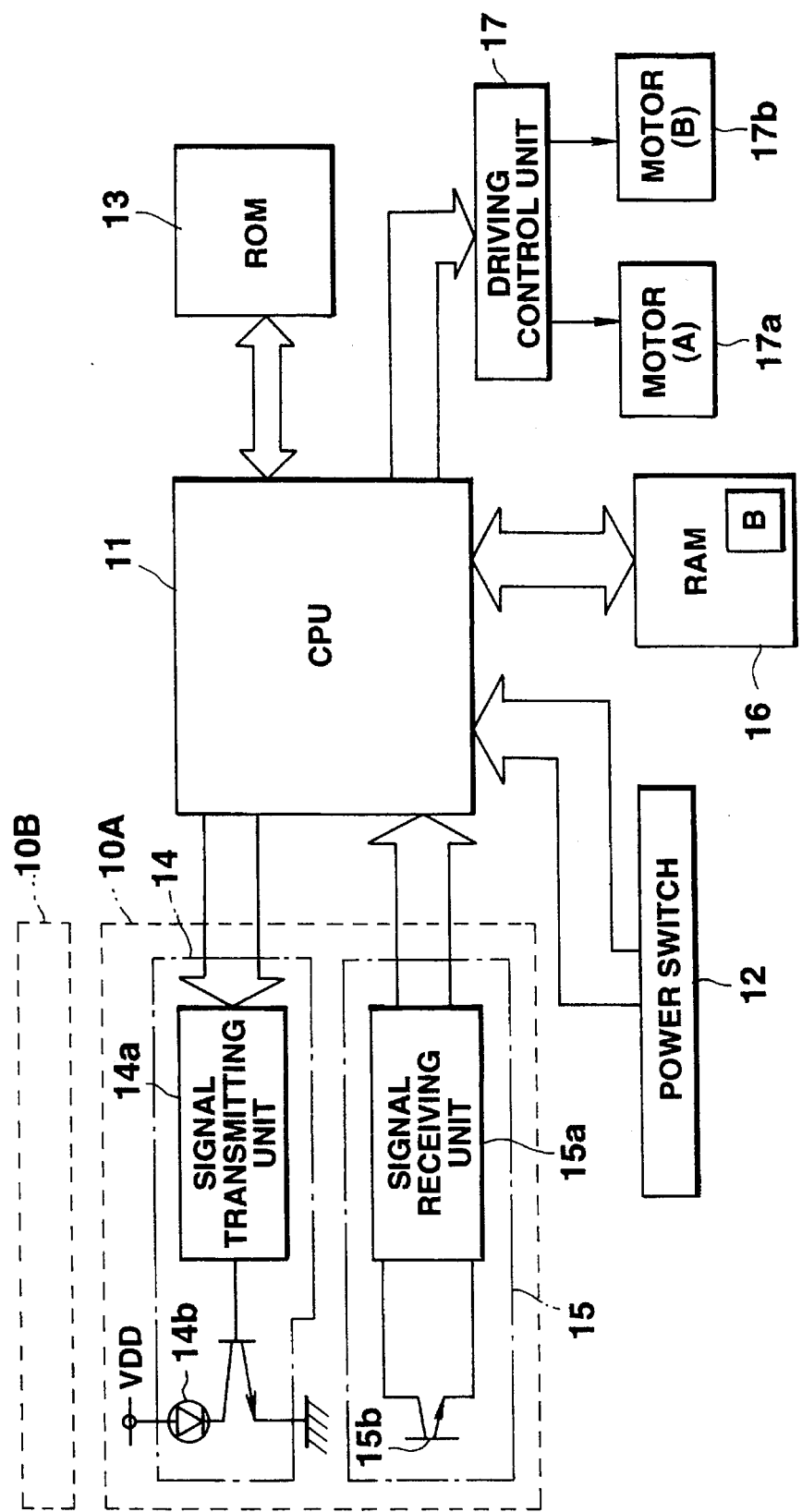
FIG. 1 is a circuit diagram of a robot that is installed with an electronic apparatus of a first embodiment of the present invention.

FIG. 1 is a circuit diagram of a robot that is installed with a switching apparatus according to the present invention.

The robot is provided with a central processing unit (CPU) 11. The CPU 11 controls operations of peripheral circuits in accordance with a system program, which is previously stored in ROM 13 and is driven to run in response to a power-on signal sent from a power switch 12. The CPU 11 is connected with the power switch 12, the ROM 13, two signal transmitting/receiving units 10A and 10B, and RAM 16. Each of the signal transmitting/receiving units 10A and 10B includes a signal transmitting unit 14 and a signal receiving unit 15.

Further, the CPU 11 is connected with a driving motor (A) 17a and a driving motor (B) 17b through a driving control unit 17. The driving motor (A) 17a is provided for driving a right arm of the robot to rotate and the driving motor (B) 17b a driving the left arm of the robot to rotate.

The signal transmitting/receiving unit 10A is provided on a right shoulder portion of the robot and the signal transmitting/receiving unit 10B is provided on a left shoulder portion of the robot.

In the ROM 13 is stored the system program following which the CPU 11 controls operations of the peripheral circuits. For example, a robot-arm control program is previously stored in the ROM 13, which program is for controlling the driving motors (A) 17a and (B) 17b in response to signals received by the signal transmitting/receiving units 10A and 10B to rotate the right and left arms of the robot.

The signal transmitting unit 14 of each of the signal transmitting/receiving units 10A and 10B are provided with a signal transmitting circuit 14a and a light emitting element 14b. The signal transmitting unit 14 emits an infrared light in response to a signal-transmitting instruction signal.

The signal receiving unit 15 of each of the signal transmitting/receiving units 10A and 10B is provided with a signal transmitting circuit 15a and a light receiving element 15b. The light receiving element 15b receives an infrared light externally transmitted thereto. A receiving state of the infrared light received by the light receiving element 15b is supplied to the CPU 11 through the signal receiving circuit 15a.

The RAM 16 has work registers, which are used when the robot-arm control program is executed. One of the work registers is a left light receiving register B, to which a value "1" is set when the signal receiving unit 15 of the signal transmitting/receiving unit 10B provided on the left shoulder of the robot body receives the infrared light.

Figure 2:
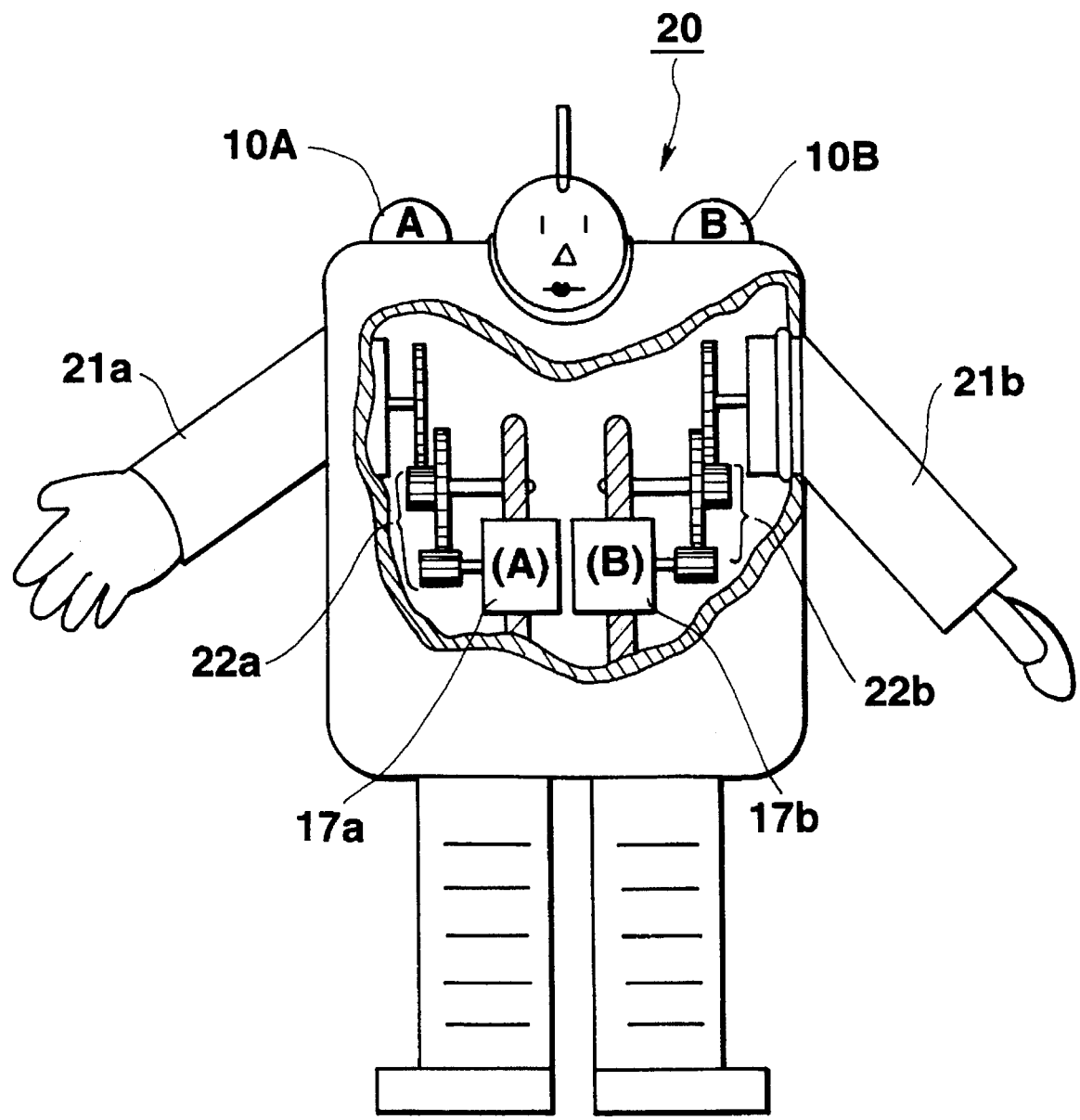
FIG. 2 is an external view, partially broken away view of whole structure of the robot.

FIG. 2 is a partially broken away view of the whole structure of the robot.

The signal transmitting/receiving units 10A and 10B are provided on the right and left shoulders of the robot body 20, respectively.

The right arm 21a is rotated by the driving motor (A) 17a through reduction gears 22a while the left arm 21b is rotated by the driving motor (B) 17b through reduction gears 22b.

Now, operation of the robot with the above structure will be described.

Figure 3:
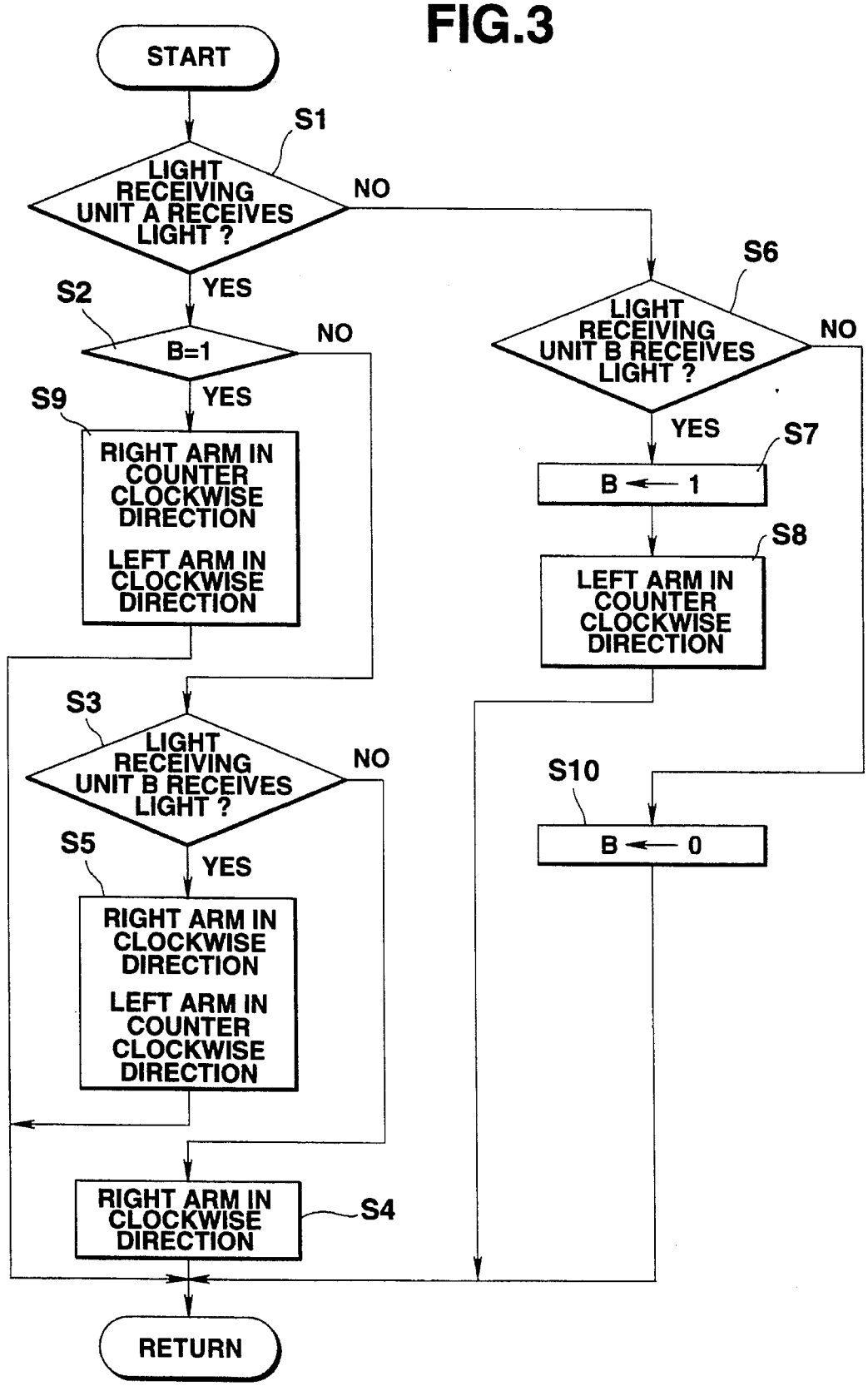
FIG. 3 is a flow chart of an arm controlling process of the robot.

FIG. 3 is a flow chart of an arm controlling process of the robot.

Figure 4:
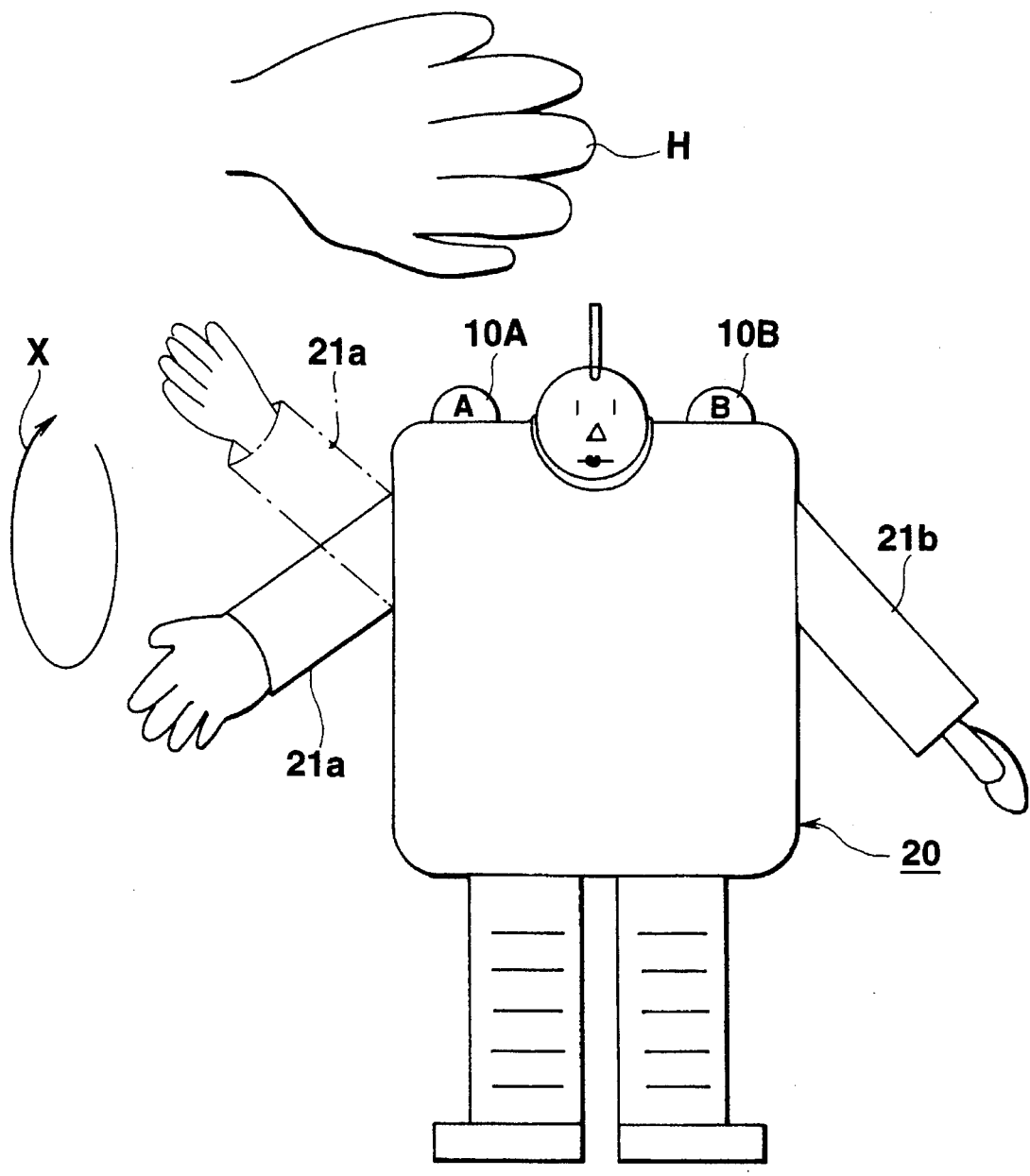
FIG. 4 is a view illustrating an operational state of the arm of the robot in the arm controlling process.

FIG. 4 is a view illustrating an operational state of the arm of the robot in the arm controlling process.

When the power switch 12 is turned on, the robot-arm control program previously stored in ROM 13 is driven to run in response to the power-on signal sent from the power switch 12. In the signal transmitting units 14 of the signal transmitting/receiving units 10A, 10B provided on the shoulders of the robot body 20, the light emitting element 14b is driven by the signal transmitting circuits 14a to emit an infrared light signal upwards.

For example, as shown in FIG. 4, when a user puts his (her) hand H above the right shoulder of the robot body 20, the infrared light signal transmitted from the signal transmitting unit 14 of the signal transmitting/receiving unit 10A is reflected on the user's hand H and is received by the signal receiving unit 15 of the signal transmitting/receiving unit 10A (step S1 of FIG. 3).

When the infrared light signal reflected from the user's hand H is received by the signal receiving unit 15 of the signal transmitting/receiving unit 10A provided on the right shoulder of the robot body 20, it is judged whether a value "1" has been set to the left light receiving flag register B of the RAM (step S2). Since a value "0" has been set to the left light receiving flag register B, it is judged whether the infrared light signal is received by the signal transmitting/receiving unit 10B provided on the left shoulder of the robot body (step S3).

Since only the signal transmitting/receiving unit 10A provided on the right shoulder of the robot body 20 receives the reflected infrared light signal in response to a non-contact operation performed by the user with his hand H, it is determined "NO" at step S3.

Then, the CPU 11 drives the driving motor (A) 17a through the driving control unit 17 to rotate the right arm 21a of the robot body in a clockwise direction as shown by an arrow X in FIG. 4 (step S4).

That is, when the user puts his hand H above the right shoulder of the robot body 20, the right arm 21a of the robot body 20 is controlled to rotate in a clockwise direction.

When the user moves his hand H from above the right shoulder to above the left shoulder, and the reflected infrared light signal is received by the signal transmitting/receiving unit 10B provided on the left shoulder of the robot body 20, it is determined "YES" at step S3. Then, the CPU 11 drives both the driving motors (A) 17a and (B) 17b through the driving control unit 17 to rotate the right arm 21a in a clockwise direction and to rotate the left arm 21b in a counter clockwise direction (step S5).

That is, when the user moves his hand H from above the right shoulder of the robot body 20 to above the left shoulder, the right arm 21a of the robot body 20 is controlled to rotate in a clockwise direction and the left arm 21b is controlled to rotate in a counter clockwise direction.

Meanwhile, when the power switch 12 is turned on and the user puts his hand H above the left shoulder of the robot body 20, the infrared light signal reflected on the user's hand H is received by the signal transmitting/receiving unit 10B (step S6). Then, a value "1" is set to the left light receiving register B of the RAM 16 (step S7) and the CPU 11 drives the driving motor (B) 17b through the driving control unit 17 to rotate the left arm 21b of the robot body 20 in a counter clockwise direction (step S8).

That is, when the user puts his hand H above the left shoulder of the robot body 20, the left arm 21b of the robot body 20 is controlled to rotate in a counter clockwise direction.

When the user moves his hand H from above the left shoulder to above the right shoulder, and further the reflected infrared light signal is received by the signal transmitting/receiving unit 10A provided on the right shoulder of the robot body 20, it is judged "YES" at step S1. Since a value "1" is set to the left light receiving flag register B of the RAM 16, it is judged "NO" at step S2. Then, the CPU 11 drives both the driving motors (A) 17a and (B) 17b through the driving control unit 17 to rotate the right arm 21a in a counter clockwise direction and to rotate the left arm 21b in a clockwise direction (step S9).

That is, when the user moves his hand H from above the left shoulder of the robot body 20 to above the right shoulder, the right arm 21a of the robot body 20 is controlled to rotate in a counter clockwise direction and the left arm 21b is controlled to rotate in a clockwise direction.

When the user performs no non-contact operation and the signal transmitting/receiving units 10A, 10B receive no reflected infrared light signal (steps S1, S6), the left light receiving flag register B of the RAM 16 is reset to "0" (step S10).

In the robot with the above structure, two signal transmitting/receiving units 10A, 10B, which transmit receive the infrared light signal are provided on the right and left shoulders of the robot body 20. When the user puts his hand H above the right or left shoulder of the robot body, the infrared light signal transmitted from the signal transmitting/receiving unit 10A or 10B above which user's hand H is put is reflected on the user's hand H and is received by the signal transmitting/receiving units 10A and/or 10B. Both the driving motor (A) 17a for driving the right arm and the driving motor (B) 17b for driving the left arm are driven or one of them is driven, depending on whether both the signal transmitting/receiving units 10A and 10B receive the reflected infrared light signal or one of them receives the reflected infrared light signal. The right arm 21a and the left arm 21b are driven to selectively rotate in a clockwise direction or a counter clockwise direction. Therefore, control devices such as a remote control device, which always requires mechanical key input operation to work, are not necessary for moving the mechanism of the robot. Only the user's non-contact operation such as gestures or motions made according to actual sense moves the mechanism of the robot.

In the above embodiment, two signal transmitting/receiving units 10A, 10B are provided on the robot, and movement of the robot is controlled depending on whether both the signal transmitting/receiving units 10A, 10B or one of them receive the reflected infrared light signal. One signal transmitting/receiving unit may be used. Further, in the above embodiment, movement of the arms of the robot is controlled but other portions of the robot such as a head and legs thereof may be moved. Movement of these portions of the robot may be controlled in accordance with the number of times of receipt of the infrared light signal, a time duration of receipt of the infrared light signal, intensity of the received infrared light signal and time intervals between the received infrared light signals.

Hereafter, another switching apparatus according to the present invention will be described which detects user's gesture to switch images displayed on a display unit.

SECOND EMBODIMENT

A second embodiment of the present invention will be described.

Figure 5:
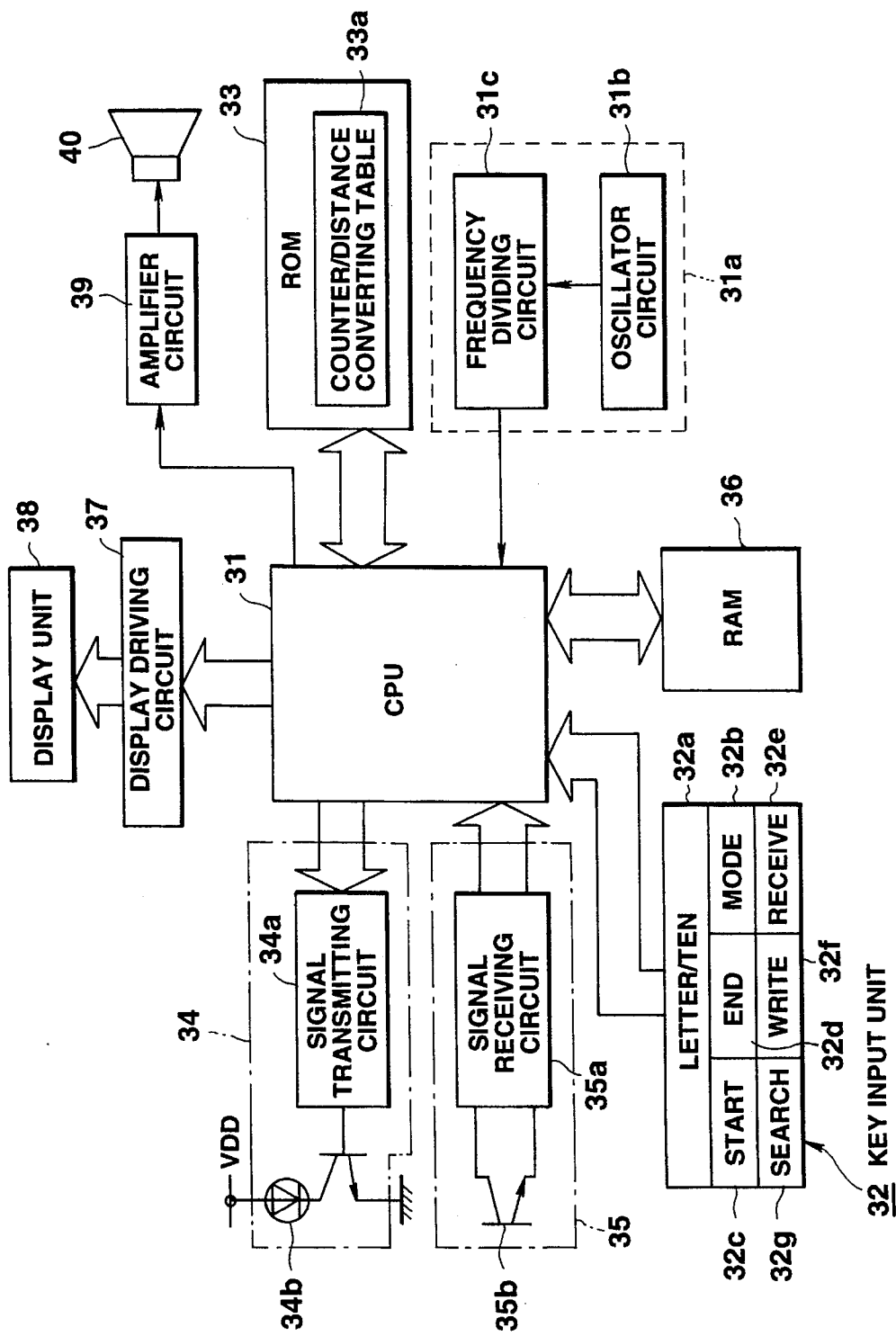
FIG. 5 is a circuit diagram of an electronic notebook, which is installed with a first switching apparatus according to the first embodiment of the present invention.

FIG. 5 is a circuit diagram of an electronic notebook incorporating a first switching apparatus according to the present invention.

The electronic notebook is installed with CPU 31. The CPU 31 controls operations of various circuits in accordance with the system program, which is previously stored in ROM 33 and is driven by a key operation signal from a key input unit 32. The CPU 31 is connected with the key input unit 32, the ROM 33, a signal transmitting unit 34, a signal receiving unit 35 and RAM 36.

Further, the CPU 31 is connected with a timer 31a including an oscillator circuit 31b and a frequency dividing circuit 31c, and is connected with a liquid crystal display unit 38 through a display driving circuit 37 and, further, is connected with a speaker 40 through an amplifier circuit 39.

The key input unit 32 includes letter/ten keys 32a, a mode key 32b, a start key 32c, an end key 32d, a signal receiving key 32e, a write key 32f and a search key 32g. The letter/ten keys 32a are operated to register notebook data such as "names", "phone numbers", etc. The mode key 32b is operated to switch a notebook mode to an image display mode and vice versa. The start key 32c is operated to start transmitting notebook data to other electronic device in a notebook mode and to start emitting an infrared light in an image display mode. The end key 32d is operated to stop receiving notebook data from other electronic device in the notebook mode and to stop emitting the infrared light in the image display mode. The signal receiving key 32e is operated to receive notebook data from other electronic device in the notebook mode.

The write key 32f is used in the notebook mode to register in the RAM 36 notebook data input by operation of the letter/ten keys 32a and notebook data transmitted from other electronic device. The search key 32g is operated to search for notebook data through the RAM 36.

In the ROM 33 are previously stored the system program for the CPU 31 to perform a control operation, plural image data and effect sound data corresponding to image data.

FIG. 6 is a view showing image data and effect sound data previously stored in the ROM 33 of the electronic notebook.

More specifically, four sets of bit map data representing images of a character (dog), each set including two bit map data (1) and (2), and four PCM data of effect sounds are stored respectively at addresses "M=0" to "M=3" in the ROM 33, as shown in FIG. 6.

The ROM 33 is provided with a counter/distance converting table 33a, in which distance data corresponding respectively to count values are stored. The distance data corresponding to a count value representing a time duration from the emission of the infrared light to reception of the reflected infrared light is read out from the counter/distance converting table 33a. The read out distance data is used to obtain a distance between the electronic notebook which emits the infrared light and a position where the infrared light is reflected.

The signal transmitting unit 34 includes a signal transmitting circuit 34a and a light emitting element 34b, and emits an infrared light in response to a signal received from the CPU 31. In the notebook mode, the infrared light emitted from the light emitting element 34b is modulated with notebook data entered and displayed by operation of the letter/ten keys 12a or with notebook data searched and displayed by operation of the search key 32g. The modulated infrared light is transmitted from the transmitting circuit 34a in response to operation of the start key 32c.

In the image display mode, an infrared light of a predetermined frequency is output in response to an instruction from the CPU 11 through the signal transmitting circuit 34a and the light emitting element 34b.

The signal receiving unit 35 includes a signal receiving circuit 35a and a light receiving element 35b, which receives an infrared light externally supplied thereto. In the notebook mode, a modulated infrared light of notebook data transmitted from an external device is received by the light receiving element 35b and is demodulated by the signal receiving circuit 35a. The demodulated signal is displayed on the liquid crystal display unit 38.

In the image display mode, an infrared light transmitted from other device or a reflected infrared light emitted from the signal transmitting unit 34 is received by the light receiving element 35b and a receiving state of the infrared light is transferred to the CPU 31 by the signal receiving circuit 35a.

Figure 7:
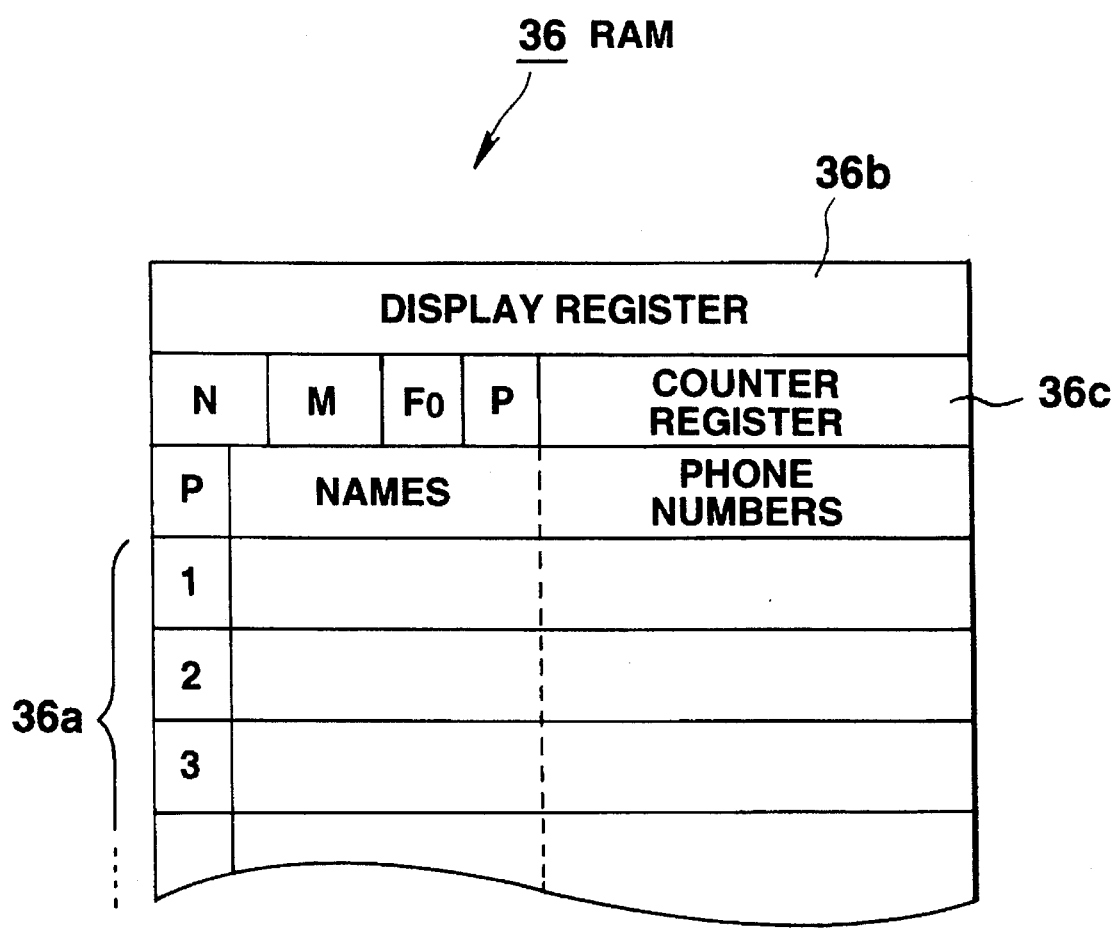
FIG. 7 is a view illustrating a structure of RAM of the electronic notebook.

FIG. 7 is a view showing structure of registers of the RAM 36 of the electronic notebook.

The RAM 36 comprises a notebook data register 36a, a display register 36b, a counter register 36c, a mode flag register N, an ROM address register M, a signal-receiving flag register F0. Notebook data (names, phone numbers) for a predetermined number of persons are registered at addresses designated by a pointer P in the notebook data register 36a. Display data to be displayed on the liquid crystal display unit 38 are written as image data in the display register 34b. A count value is written in the counter register 36c, which value is counted by the CPU 31 during a time duration from the emission of the infrared light by the signal transmitting unit 34 to reception of the reflected infrared light by the signal receiving unit 35. The mode flag register N is set to a value "0" in the notebook mode, and to a value "1" in the image display mode. The ROM address register M represents addresses ("M=0, 1, 2 and 3") in the ROM 33 indicating areas where the character data and effect sound data are stored. The signal receiving flag register F0 is set to a value "1" while notebook data is being received in the notebook mode.

In the notebook mode, notebook data input by operation of the letter/ten keys 32a, notebook data searched through the notebook data register 36a of the RAM 36 in response to operation of the search key 32g or notebook data received by the signal receiving unit 35 in response to operation of the signal receiving key 32e is displayed on the liquid crystal display unit 38.

In the image display mode, one set of bit map data read out from the ROM 33 in accordance with an ROM address designated by the ROM address register M of the RAM 36 is alternatively displayed on the liquid crystal display unit 38 for one second.

An effect sound is output through the speaker 40, which sound is generated based on effect sound data read out from the ROM 33 in accordance with the ROM address designated by the ROM address register M of the RAM 36.

The timer 31a supplies a timer signal, for example, of 32 Hz. to the CPU 31. Time counting data T is incremented every timer signal of 32 Hz. Therefore, it is determined that T=32 corresponds to one second and T=64 corresponds to two seconds.

In the image display mode, a distance between the present location where the infrared light is emitted and a location where the infrared light is reflected is obtained from the counter/distance converting table 33a in the ROM 33 based on a count value read out from the counter register 36c of the RAM 36. When the obtained distance is not more than 30 centimeters, a value "1" is set to the ROM address register M. When the distance falls within a range of 31–60 centimeters, a value "2" is set to the ROM address register M. Further, when the distance falls within a range of 61–90 centimeters, a value "3" is set to the ROM address register M.

In other words, when the infrared light emitted from the signal transmitting unit 34 is reflected by non-contact operation by the user, and is received by the signal receiving unit 35, an address value is set, which address value corresponds to a distance between the signal transmitting unit 34 and a location where the infrared light is reflected or where the non-contact operation is performed by the user.

Now, operation of the electronic notebook with the above structure will be described.

Figure 8:
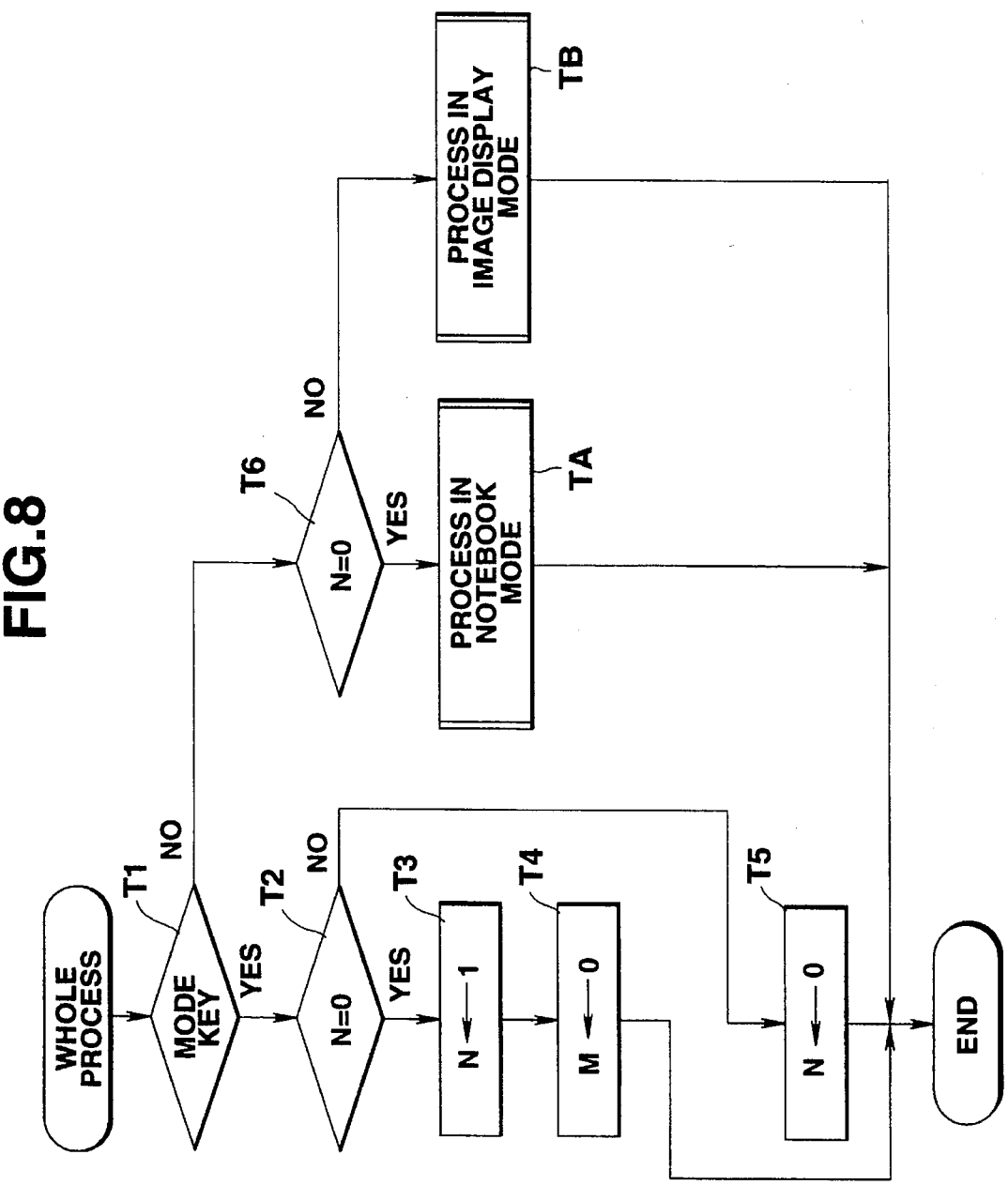
FIG. 8 is a flowchart of a general process of the electronic notebook.

FIG. 8 is a general flowchart of processes in the electronic notebook.

In the case that a value "0" has been set to the mode flag register N of the RAM 36, that is, the CPU 31 has been set to the image display mode, a value "1" is set to the mode flag register N and the CPU 31 is switched and set to the image display mode, when the mode key 32b is operated (steps T1, T2 and T3 of FIG. 8).

When the CPU 31 is set to the image display mode, a value "0" is set to the ROM address register M (step T4).

In the case that a value "1" has been set to the mode flag register N of the RAM 36, that is, the CPU 31 has been set to the image display mode, a value "0" is set to the mode flag register N and the CPU 31 is switched and set to the notebook mode, when the mode key 32b is operated (steps T1, T2 and T5).

In the notebook mode where a value "0" is set to the mode flag register N of the RAM 36, the CPU 31 performs processes in the notebook mode (refer to FIG. 9) (steps T6, TA).

In the image display mode where a value "1" is set to the mode flag register N of the RAM 36, the CPU 31 performs processes in the image display mode (refer to FIGS. 10–14) (steps T6, TB).

Figure 9:
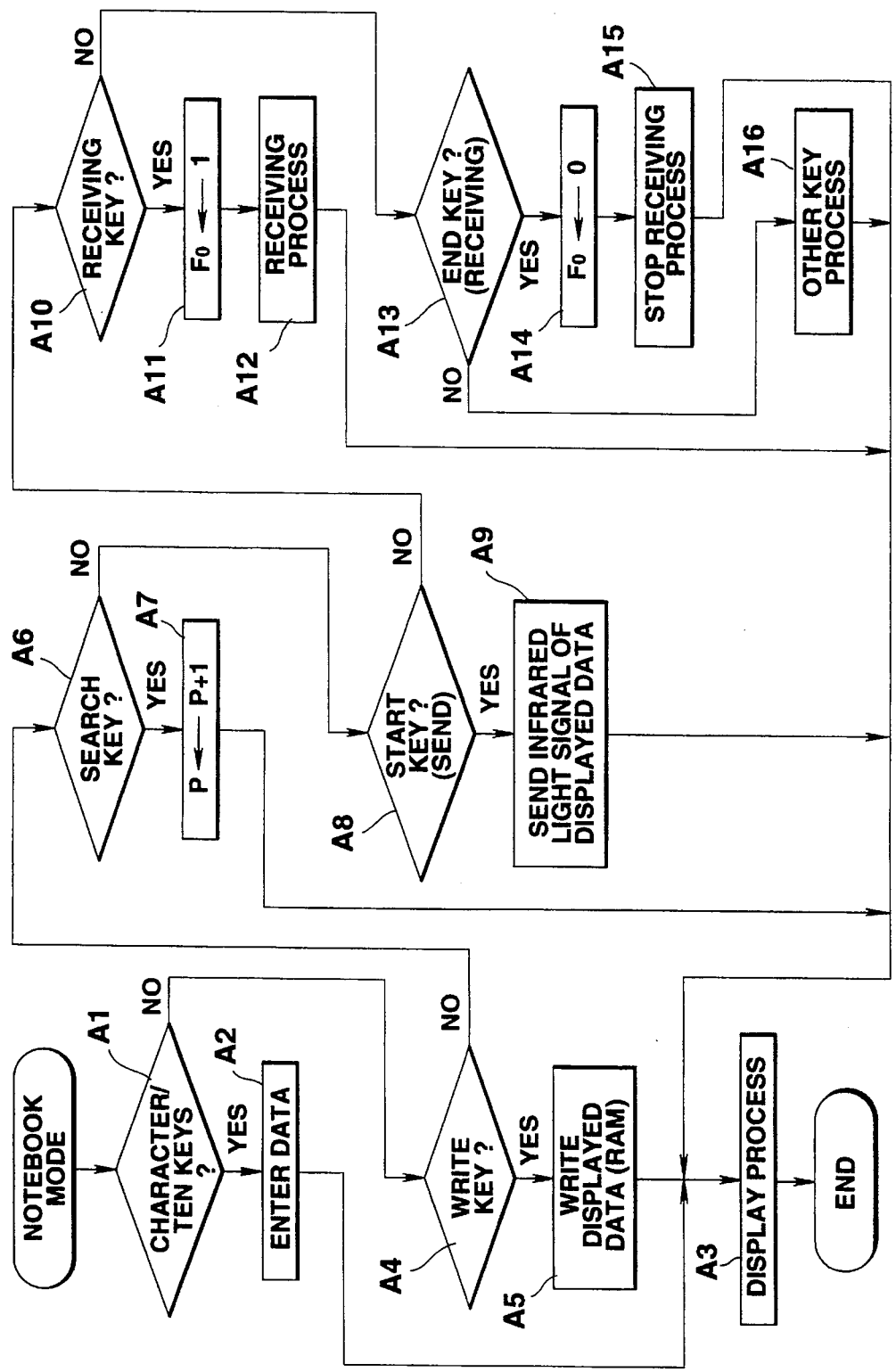
FIG. 9 is a flowchart of processes in a notebook mode of the electronic notebook.

FIG. 9 is a flowchart of processes in the notebook mode of the electronic notebook.

In the notebook mode where a value "0" is set to the mode flag register N of the RAM 36, notebook data such as a name and a phone number are entered by operation of the letter/ten keys 32a of the key input unit 32. The CPU 31 controls the display driving circuit 37 to successively display the entered notebook data on the display unit 38 (steps A1, A2 and A3 in FIG. 9).

Operation of the write key 32f of the key input unit 32 registers the notebook data displayed on the display unit 38 in the notebook data register 36a of the RAM 36 (steps A4, A5).

Further, in the notebook mode, when the search key 32g of the key input unit 32 is operated, notebook data for a predetermined number of persons are successively searched through the notebook data register 36a, and the searched notebook data are read out to the CPU 31 and are displayed on the display unit 38 through the display driving unit 37. Every operation of the search key 32g increments the notebook data pointer P or adds a value "1" to the pointer P (steps A6, A7 and A3).

Operation of the start key 32c of the key input unit 32 in the notebook mode sends the notebook data displayed on the display unit 38 to the signal transmitting unit 34. The notebook data sent to the signal transmitting unit 34 is converted into an infrared light signal by the signal transmitting circuit 34a and the light emitting element 34b and is transmitted to other electronic device (steps A8, A9).

When the signal receiving key 32c of the key input unit 32 is operated, a value "1" is set to the signal receiving flag register F0 of the RAM 36, and notebook data (an infrared light signal) sent from other electronic device is received by the signal receiving unit 35. The CPU 31 controls the display driving circuit 37 to display the received notebook data on the display unit 38 (steps A10, A11, A12 and A3).

Operation of the end key 32d of the key input unit 32 sets a value "0" to the signal receiving flag register F0 of the RAM 36, and stops receiving notebook data (infrared light data) sent from other electronic device (steps A13, A14 and A15).

Figure 10:
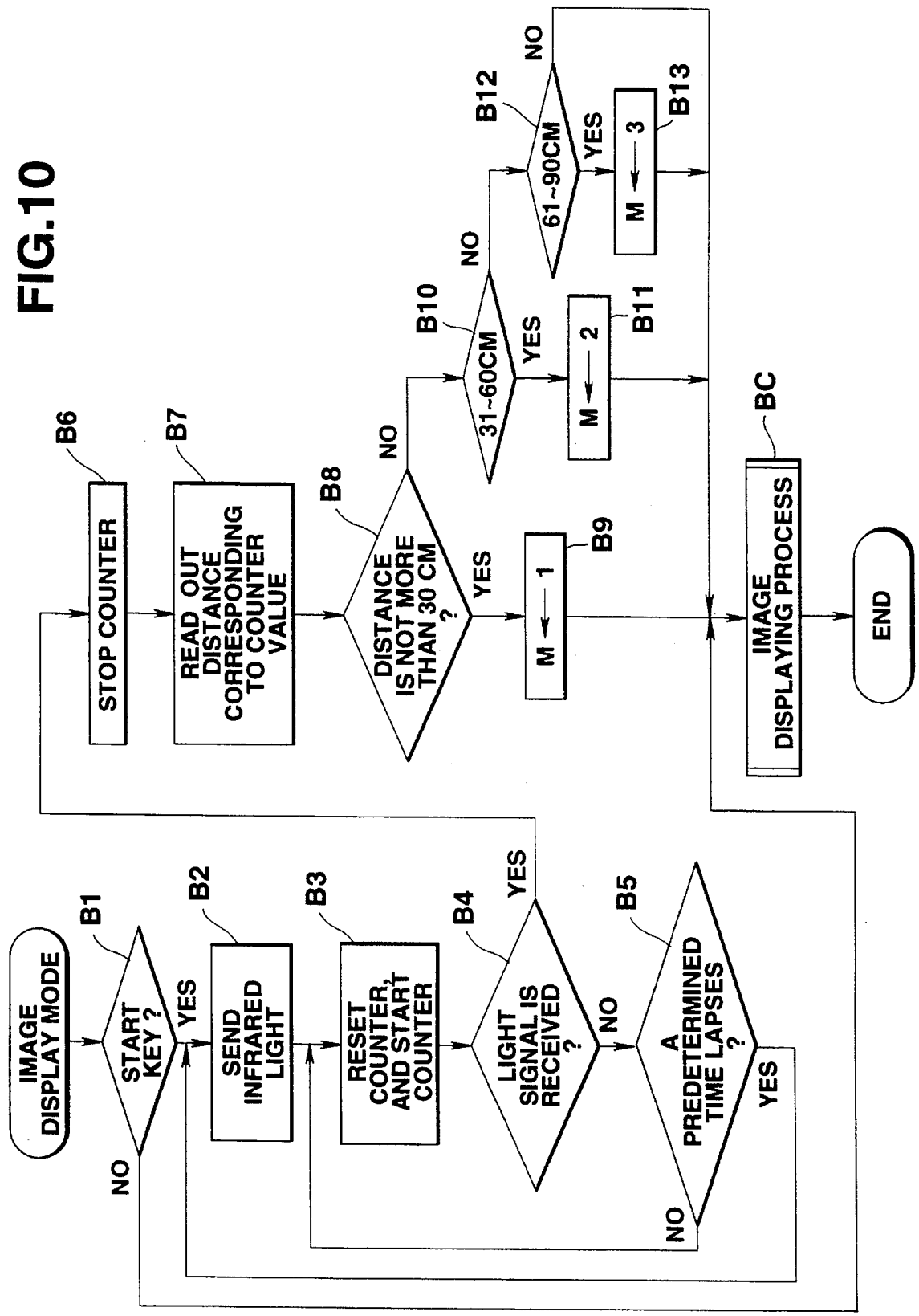
FIG. 10 is a flowchart of processes in an image display mode of the electronic notebook.

FIG. 10 is a flowchart of processes in the image display mode of the electronic notebook.

Figure 11:
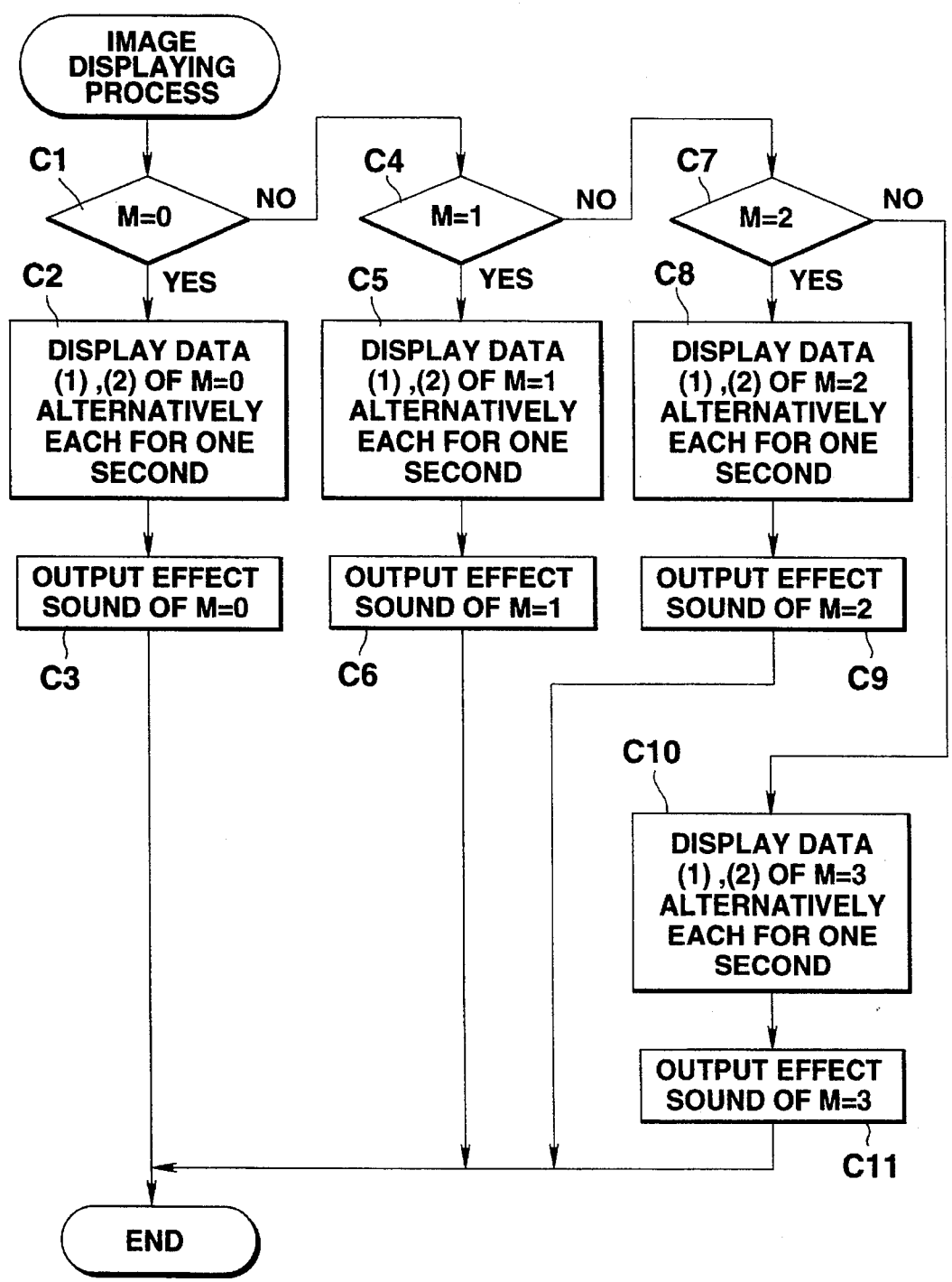
FIG. 11 is a flowchart of an image display process in the image display mode of the electronic notebook.

FIG. 11 is a flowchart of an image display process in the image display mode of the electronic notebook.

Figure 12:
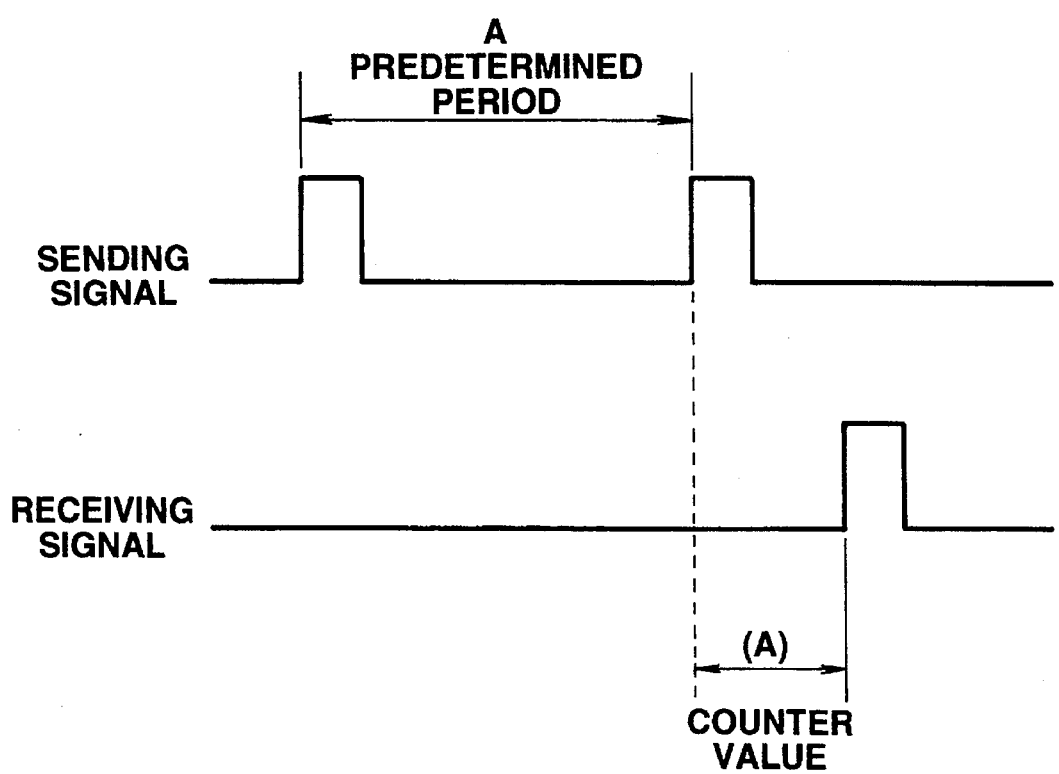
FIG. 12 is a timing chart illustrating by way of example an infrared light emitting timing and an infrared light receiving timing in the processes in the image display mode of the electronic notebook.

FIG. 12 is a timing chart illustrating by way of example an infrared light emitting timing and an infrared light receiving timing in the processes in the image display mode of the electronic notebook.

Figure 13:
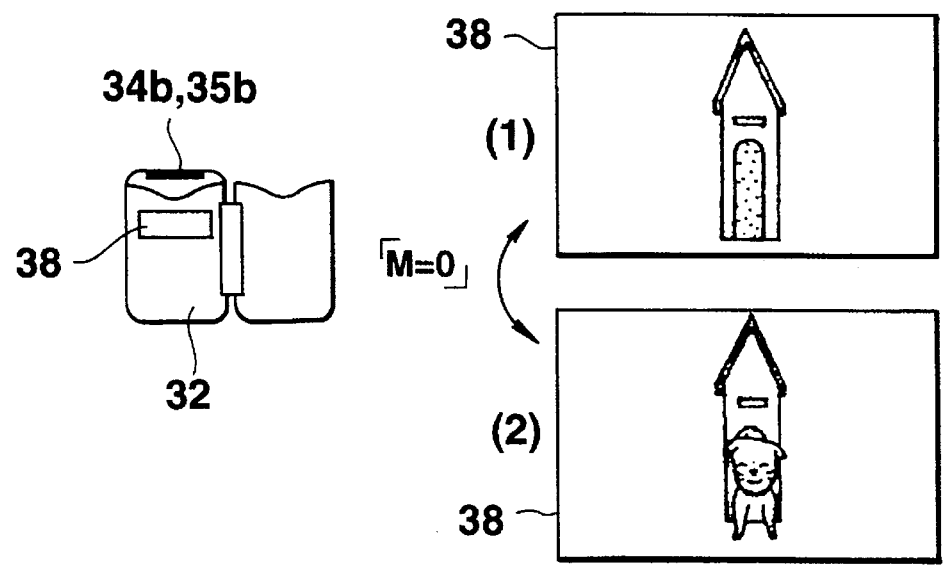
FIG. 13 is a view illustrating a character (a dog) that is displayed when the image display mode is set.

FIG. 13 is a view illustrating a character that is displayed when the image display mode is set.

Figure 14:
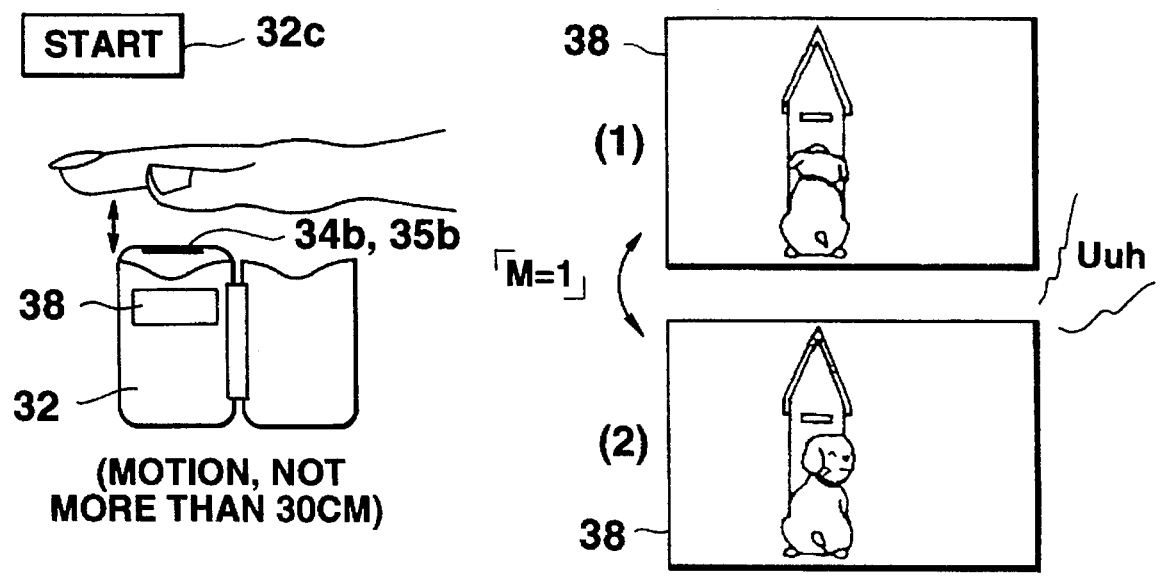
FIG. 14 is a view illustrating the character displayed in the image display mode when a user performs a non-contact operation within a range of not more than 30 centimeters apart from the electronic notebook.

FIG. 14 is a view illustrating the character displayed in the image display mode when the user performs a non-contact operation within a range of not more than 30 centimeters apart from the electronic notebook.

Figure 15:
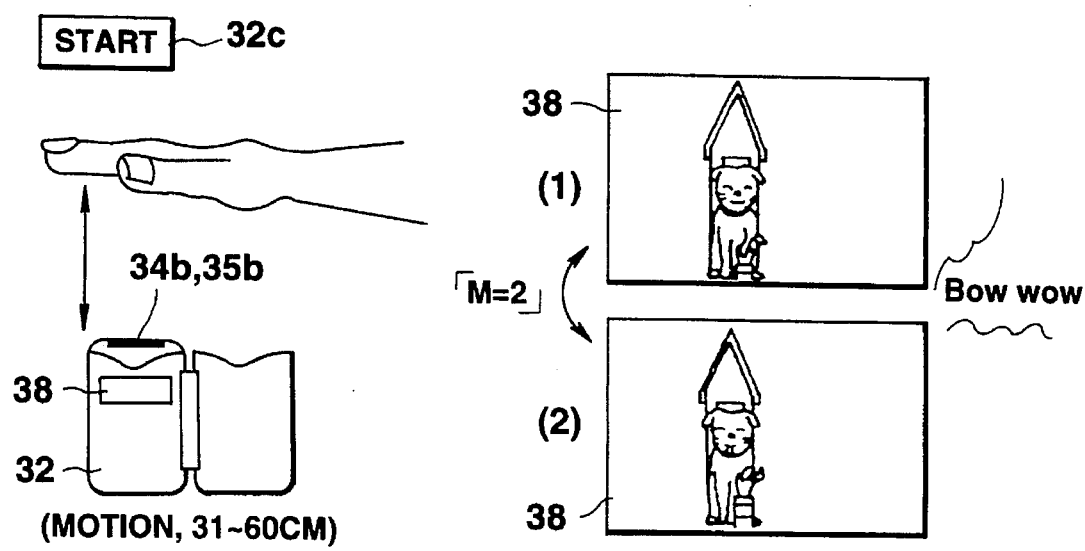
FIG. 15 is a view illustrating the character displayed in the image display mode when the user performs a non-contact operation within a range from 31 to 60 centimeters apart from the electronic notebook.

FIG. 15 is a view illustrating the character displayed in the image display mode when the user performs the non-contact operation within a range from 31 to 60 centimeters apart from the electronic notebook.

When the mode key 32b of the key input unit 32 is operated at step T1 of the general flowchart of FIG. 8, a value "1" is set to the mode flag register N of the RAM 36 and at the same time a value "0" is set to the ROM address register M. Then, the image display mode is set, and the CPU 31 performs processes in the image display mode (refer to FIG. 10) (steps T1, T4 and TB in FIG. 8).

In the image display mode, if the start key 32c is not operated, image display processes are executed in accordance with the flowchart FIG. 11 (steps B1, BC of FIG. 10).

Since the ROM address register M of the RAM 36 has been set to "0" at step T4 in FIG. 8, one set of character data (1), (2) corresponding to the ROM address "M=0" are read out to the CPU 31 from the ROM 33. More specifically, the character data (1) representing a kennel and the character data (2) representing a dog coming out from the kennel are alternatively displayed on the display unit 38 for one second (steps C1, C2 in FIG. 11).

Meanwhile, effect sound data corresponding to the ROM address "M=0" is processed but the effect sound data is for making no sound. Therefore, no effect sound is generated from the speaker 40 (step C3), and the image display process (steps C2) is continuously executed.

When the start key 32c of the key input unit 32 is operated, the light emitting element 34b in the signal transmitting unit 34 starts emitting an infrared light, and the counter register 36c of the RAM 36 is reset and starts a counting operation (steps B1, B2 and B3 in FIG. 10).

When the user does not perform non-contacting operation in front of the signal transmitting unit 34 and the signal receiving unit 35, the infrared light is not reflected and not reflected infrared light is received by the light receiving element 35b of the signal receiving unit 35. When the light receiving element 35b of the signal receiving unit 35 receives no reflected infrared light for a predetermined period, a transmitting process of the infrared light is executed again and the counter register 36c is reset and starts the counting operation again (step B4, B5, B2 and B3).

When the user puts his hand in front of the light emitting element 34b and the light receiving element 35b as shown in FIGS. 14 and 15 while the signal transmitting unit 34 repeatedly emits the infrared light and the counter register 36c repeatedly resets and starts the counting operation, the infrared light emitted from the light emitting element 34b is reflected on the user's hand and is received by the light receiving element 35b (steps B2 to B5). Then, the operation goes from step B4 to step B6, where the counter register 36c stops the counting operation.

The counter register 36c obtains a counter value A (FIG. 21) corresponding to a time that the infrared light emitted from the signal transmitting unit 34 takes to be reflected on the user's hand and to be received by the signal receiving unit 35. Based on the counter value A, the CPU 31 reads out a distance between the light emitting element 34b or the light receiving element 34b and user's hand from the counter/distance converting table 33a in the ROM 33 (step B7).

When it is determined that the distance is not more than 30 centimeters (FIG. 14), the ROM address register M of the RAM 36 is set to "1" (step B9) and an image display process corresponding to the ROM address "M=1" is performed (steps B8, B9 and BC).

In the flowchart of the image display process (FIG. 11), the CPU 31 reads out from the ROM 33 one set of character data (1), (2) (FIG. 6) corresponding to the renewed ROM address "M=1". The read out character data (1) and (2) are alternatively displayed on the display unit 38 each for one second, as shown in FIG. 14, in place of the previously displayed character data (1) and (2) of "M=0" (FIG. 13) (steps C4, C5 of FIG. 11). The character data (1) of "M=1" represents a back view of the dog in front of the kennel, and the character data (2) of "M=1" represents the looking back dog in front of the kennel, as shown in FIG. 14.

Further, the CPU 31 reads out effect sound data corresponding to the ROM address "M=1" from the ROM 33, and outputs an effect sound "Uhh" based on the read out effect sound data from the speaker 40 through the amplifier circuit 39 (step C6).

When it is determined that the distance read out from the counter/distance converting table 33a falls within a range of 31–60 centimeters (FIG. 15), the ROM address register M of the RAM 36 is set to "2" (step B11) and an image display process corresponding to the ROM address "M=2" is performed (steps B10, B11 and BC ).

In the flowchart of the image display process (FIG. 11), the CPU 31 reads out from the ROM 33 one set of character data (1), (2) (FIG. 6) corresponding to the renewed ROM address "M=2". The read out character data (1) and (2) are alternatively displayed on the display unit 38 each for one second, as shown in FIG. 15, in place of the previously displayed character data (1) and (2) of "M=0" (FIG. 13) (steps C7, C8). The character data (1) of "M=2" represents the dog giving hand, and the character data (2) of "M=2" represents the dog giving hand and putting out his tongue, as shown in FIG. 15.

Further, the CPU 31 reads out effect sound data corresponding to the ROM address "M=2" from the ROM 33, and outputs an effect sound "Bowwow" based on the read out effect sound data from the speaker 40 through the amplifier circuit 39 (step C9 of FIG. 11).

When it is determined that the distance read out from the counter/distance converting table 33a falls within a range of 61–90 centimeters (FIG. 15)(step B7), the ROM address register M of the RAM 36 is set to "3" (step B13) and an image display process corresponding to the ROM address "M=3" is performed (steps B12, B13 and BC).

In the flowchart of the image display process (FIG. 11), the CPU 81 reads out from the ROM 33 one set of character data (1), (2) (FIG. 6) corresponding to the renewed ROM address "M=3". The read out character data (1) and (2) are alternatively displayed on the display unit 38 each for periods of one second in place of the previously displayed character data (1) and (2) of "M=0" (FIG. 18) (steps C7, C10 of FIG. 11). The character data (1), (2) of "M=3" represents the sleeping dog in front of the kennel, as shown in FIG. 6.

Further, the CPU 31 reads out effect sound data corresponding to the ROM address "M=3" from the ROM 33, and outputs an effect sound "Kuh" based on the read out effect sound data from the speaker 40 through the amplifier circuit 39 (step C11).

In the electronic notebook with the above structure, the user's hand put apart from the light emitting element 34b and the light receiving element 35b provided in the electronic notebook body reflects the infrared light emitted from the light emitting element 34b and the reflected infrared light is received by the light receiving element 35b. The counter register 36c counts a time between the emission of the infrared light by the light emitting element 34b and the reception of the reflected infrared light by the light receiving element 35b, and obtains a counter value A corresponding to the counted time. Based on the counter value A, the CPU 31 obtains a distance between the light emitting element 34b and the user's hand from the counter/distance converting table 33a. A value of the ROM address register M is determined using the obtained distance. The CPU 31 reads out plural character (dog) data corresponding to the value of the ROM address register M and displays the read out character data representing various views of a dog such as a dog sitting in front of the kennel, a back view of the dog or the dog giving his hand. Similarly, the CPU 31 reads out the corresponding effect sound data from the ROM 33, and outputs an effect sound based on the read out effect sound data from the speaker 40. In conventional image display apparatus, the user has to operate keys to enter an instruction. The present electronic notebook, however, does not require the user to execute mechanical operation such as key operation to input an instruction. Putting his hand at various distances apart from the electronic notebook body, the user can make the electronic notebook selectively display his desired views of the character (dog).

THIRD EMBODIMENT

Now, a third embodiment of the present invention will be described.

The third embodiment of the present invention, i.e., an electronic notebook incorporating a second switching apparatus has the same circuit structure as the electronic notebook incorporating the first switching apparatus shown in FIG. 5 (except ROM and RAM). Further description thereof will be omitted.

FIG. 16 is a view illustrating image data to be displayed, which are previously stored in the ROM 33 (FIG. 5) of the electronic note book incorporating the second switching apparatus.

In the ROM of FIG. 16 are stored four sets of character data in a bit map data format. More specifically, at an address area of the ROM address "M=0" are stored one set of character (dog) data, including two character data (1), (2) (a dog in a kennel and a dog in front of the kennel). At an address area of the ROM address "M=1" are stored another one set of character data including eleven character data (1)–(11)(a dog fetching a bar thrown far by a girl). At an address area of the ROM address "M=2" are stored still another set of character data including nine character data (1)–(9)(a dog fetching a bar thrown by a girl). At an address area of the ROM address "M=3" are stored yet another set of character data including seven character data (1)–(7)(a dog fetching a bar thrown not so far by a girl).

Similarly as stated in conjunction with the electronic notebook with the first switching apparatus, the ROM of FIG. 16 has the counter/distance table 33a, in which converting data are previously stored for obtaining a distance between the electronic notebook and a position where the infrared light is reflected from the counter value.

Figure 17:
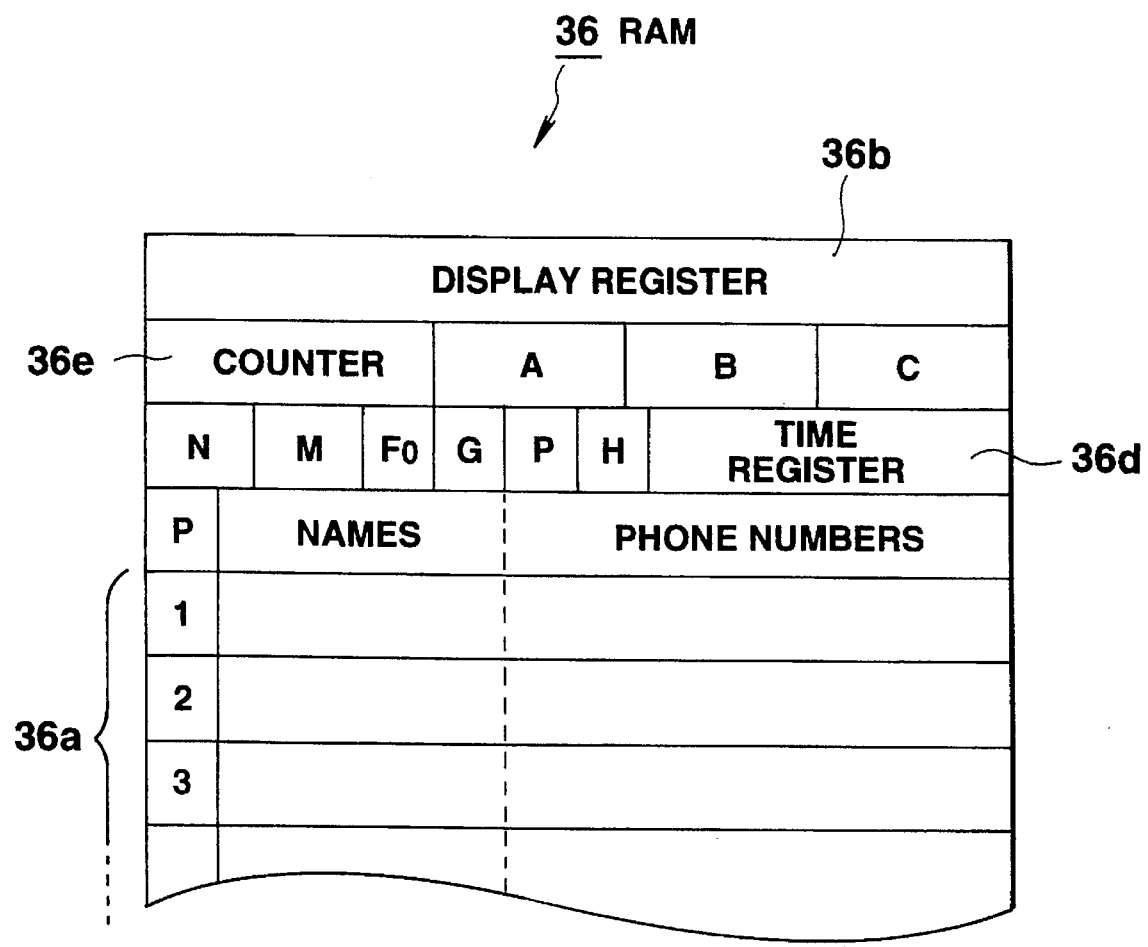
FIG. 17 is a view illustrating a structure of registers in RAM of the electronic notebook with the second switching apparatus.

FIG. 17 is a view illustrating a structure of registers in RAM 36 (FIG. 5) of the electronic notebook with the second switching apparatus.

The RAM 36 of FIG. 17 comprises the notebook data register 36a, the display register 36b, a counter register A, a counter register B, a counter register C, the mode flag register N, the ROM address register M, the signal-receiving flag register F0, a movement detecting flag register G, a light receiving flag register H and a time register 36d. Notebook data (names, phone numbers) for a predetermined number of persons are registered at addresses designated by the pointer P in the notebook data register 36a. Display data to be displayed on the liquid crystal display unit 38 are written as image data in the display register 34b. A first count value is written in the counter register A, which value is counted by the CPU 31 during a time duration from the emission of the infrared light by the signal transmitting unit 34 to reception of the reflected infrared light by the signal receiving unit 35. The first count value represents an initial position, from which the non contact operation starts. A final count value is written in the counter register B, which value is counted by the CPU 31 during a time duration from the emission of the infrared light by the signal transmitting unit 34 to reception of the reflected infrared light by the signal receiving unit 35. The final count value represents a final position, at which the non contact operation is finished. Count values are successively written in the counter register C, which values are counted by the CPU 31 while the non contact operation is between the initial position and the final position. The mode flag register N is set to a value "0" in the notebook mode, and to a value "1" in the image display mode. The ROM address register M represents addresses ("M=0, 1, 2 and 3") in the ROM 33 indicating areas where the character data are stored. The signal receiving flag register F0 is set to a value "1" while notebook data is being received in the notebook mode. The movement detecting flag register G is set to "1"

when movement of a non contact operation medium (user's hand) is detected based on the count values written in the counter register C. The light receiving flag register H is set to "1" when the infrared light is emitted by the signal transmitting unit 34 and the reflected infrared light is received by the signal receiving unit 35 for the first time. A time duration is written in the time register 36d, in which time duration the count values are successively written in the counter register C, i.e., the user is moving his hand (the non contact operation medium). In other words, the non contact operation medium is moved during the time duration written in the time register 36d.

In the image display mode, a difference between the first count value (corresponding to the initial position of the non contact operation) written in the counter register A of RAM (FIG. 17) and the final count value written in the counter register B of RAM (FIG. 17) (corresponding to the final position of the non contact operation) is calculated and a moving distance along which the non contact operation is performed is obtained from the calculated difference and the counter/distance converting table 33a in the ROM 33 of FIG. 5. Further, a moving rapidity of the non contact operation is calculated from the moving distance and the time duration written in the time register 36d of the RAM 36 of FIG. 17. When, for example, the moving rapidity of the non contact operation falls within a range of 0–1.5 m/s, a value "3" is set to the ROM address register M (FIG. 16). When the moving rapidity of the non contact operation falls within a range of 1.6–2.0 m/s, a value "2" is set to the ROM address register M (FIG. 16). Further, when the moving rapidity of the non contact operation is more than 2.1 m/s, a value "1" is set to the ROM address register M (FIG. 16).

As described above, an address value corresponding to the rapidity of the non contact operation is set to the ROM address register M (FIG. 16).

Now, operation of the electronic notebook incorporating the second switching apparatus with the above structure will be described.

A general process and processes in the notebook mode which will be performed by the electronic notebook incorporating the second switching apparatus are similar to the processes (FIGS. 8 and 9) performed by the electronic notebook incorporating the first switching apparatus. Further description thereof is omitted.

Figure 18:
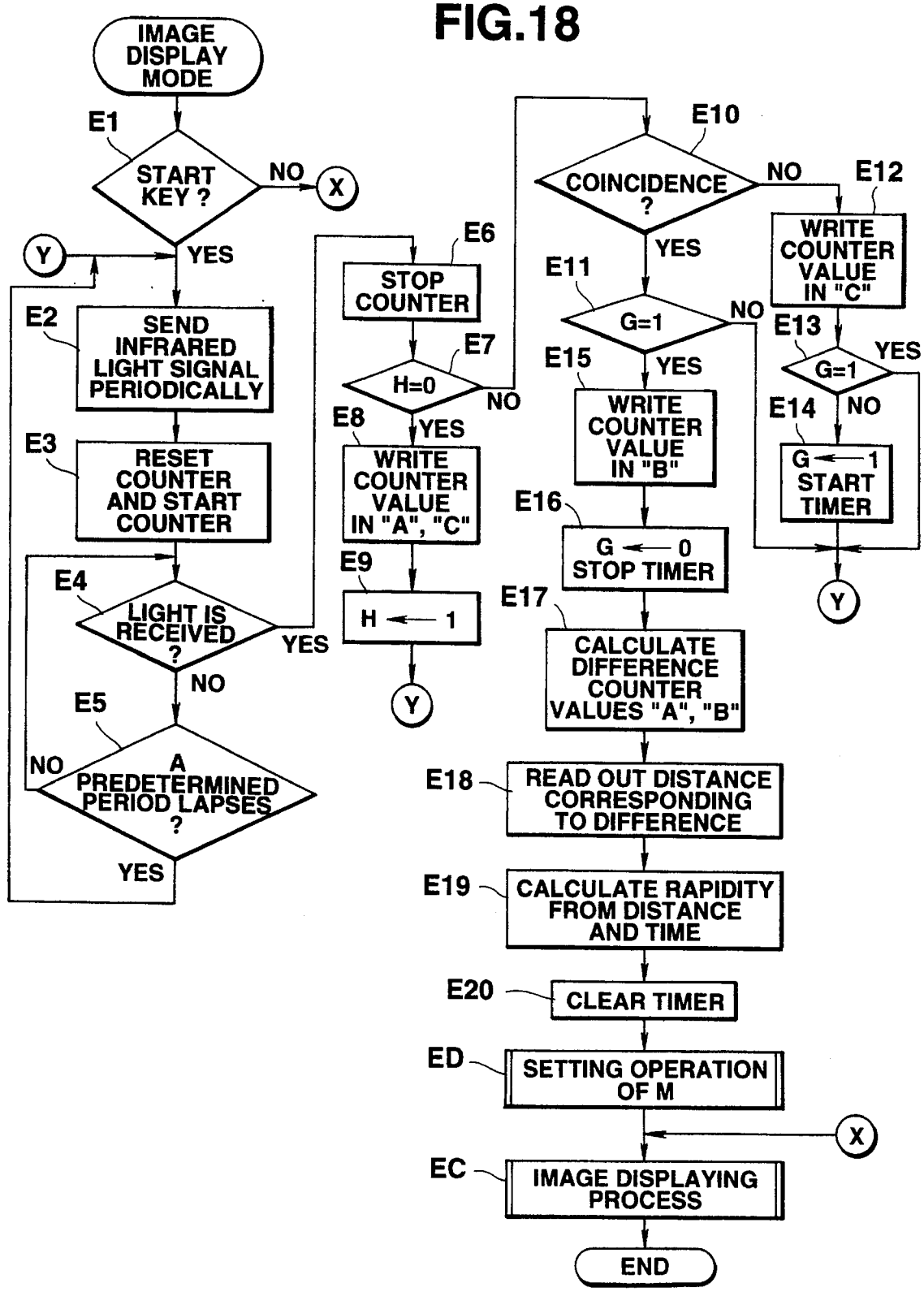
FIG. 18 is a flowchart illustrating processes in an image display mode of the electronic notebook with the second switching apparatus.
Figure 19:
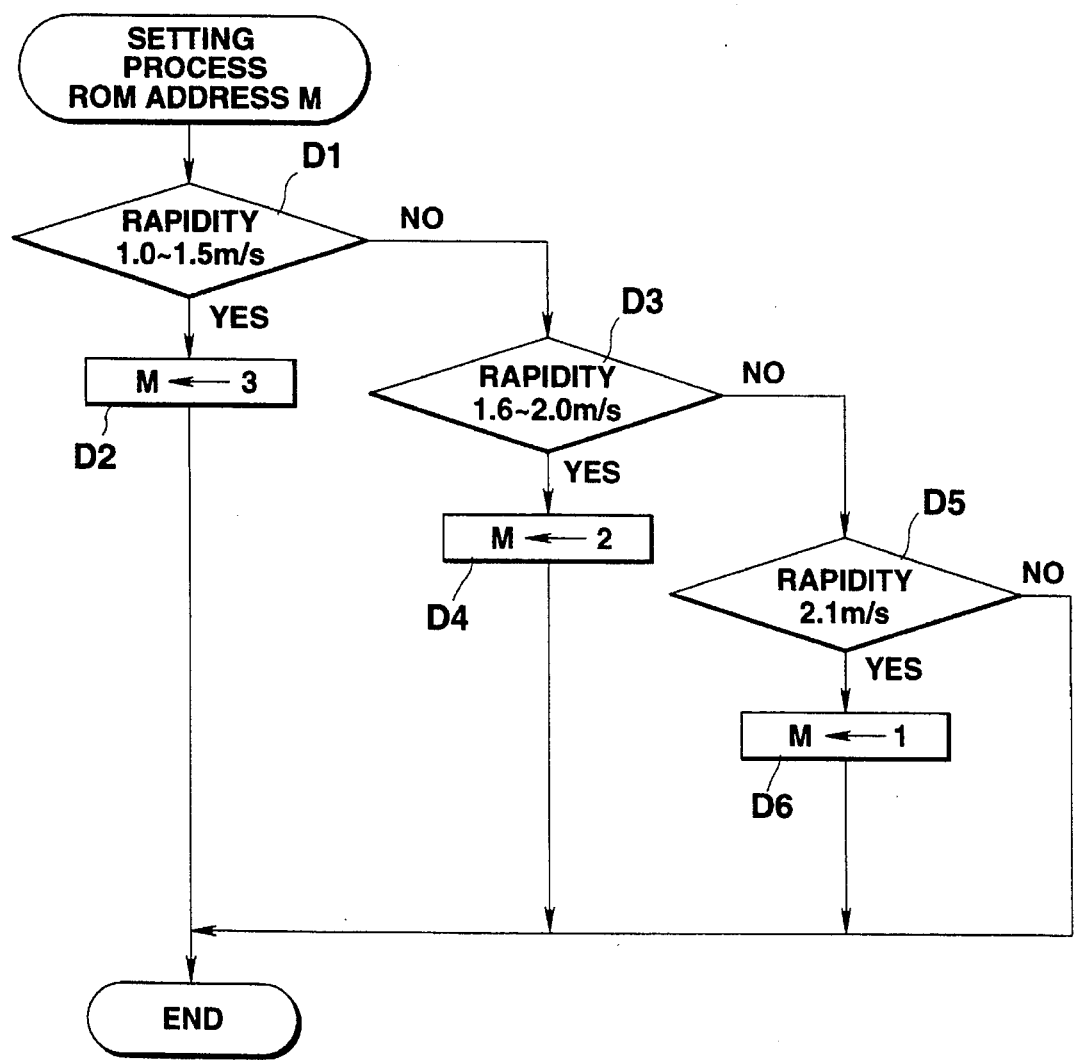
FIG. 19 is a flowchart of processes for setting an ROM address M in the image display mode of the electronic notebook with the second switching apparatus.
Figure 20:
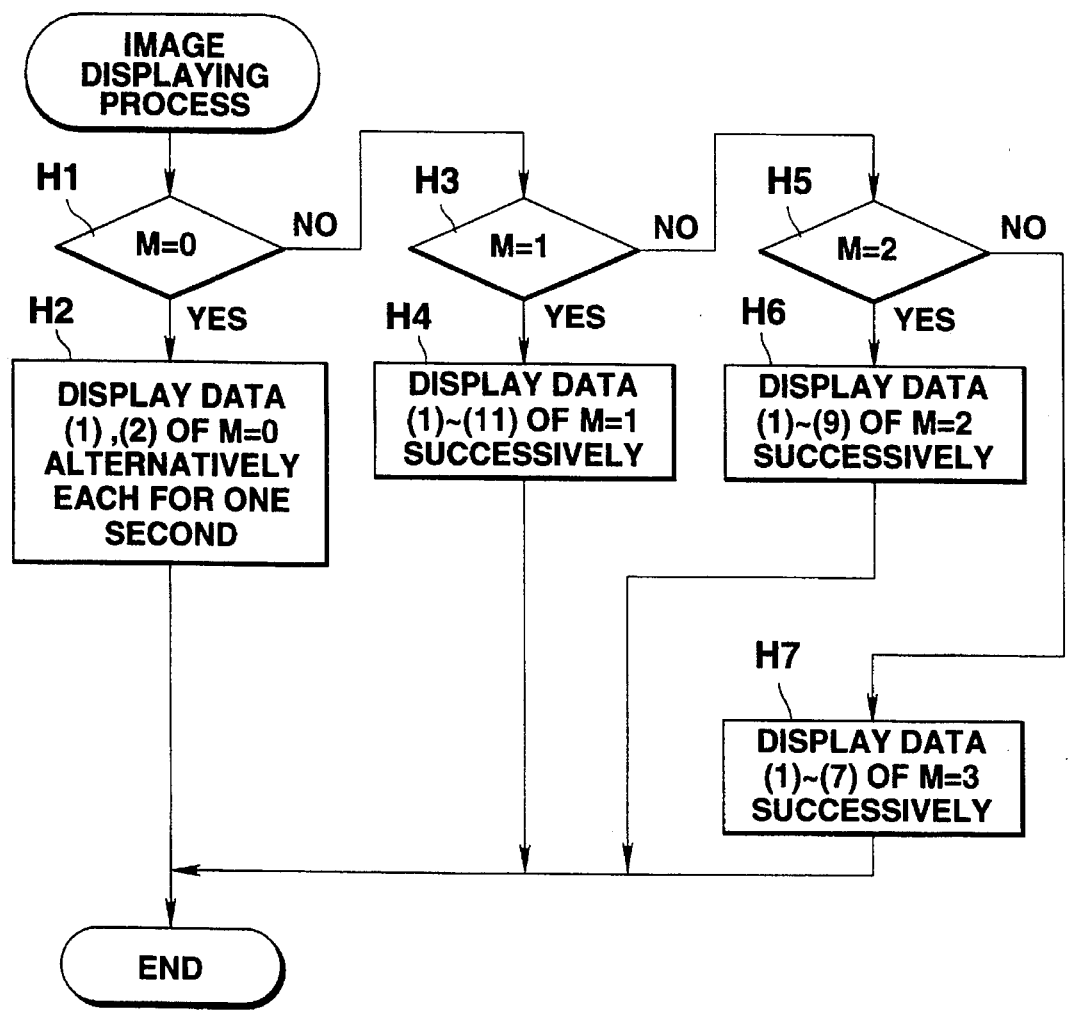
FIG. 20 is a flowchart of an image display process of the electronic notebook with the second switching apparatus.
Figure 21:
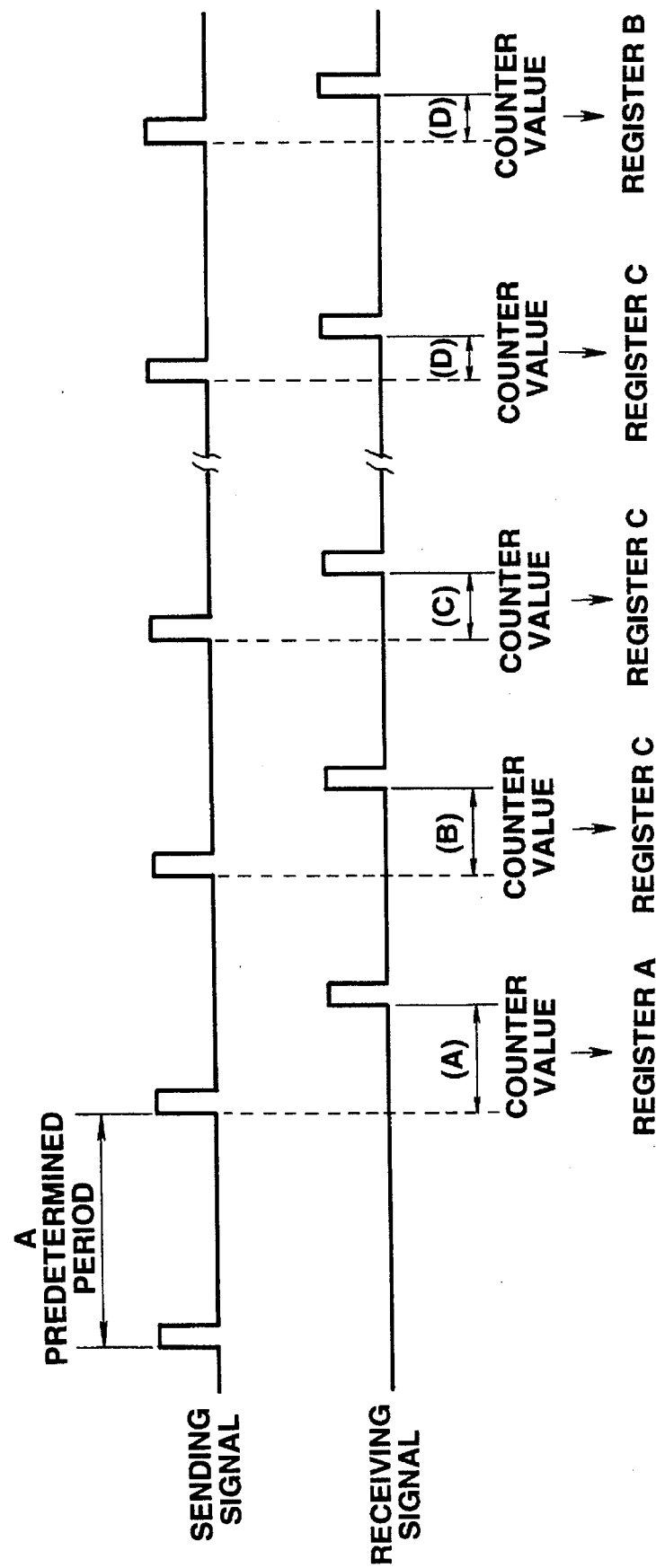
FIG. 21 is a timing chart illustrating by way of example an infrared light emitting timing and an infrared light receiving timing when a non-contact operational medium is moved in the image display mode of the electronic notebook with the second switching apparatus.

FIG. 18 is a flowchart illustrating processes in the image display mode of the electronic notebook with the second switching apparatus;

FIG. 19 is a flowchart of processes for setting the ROM address M (FIG. 16) in the image display mode of the electronic notebook with the second switching apparatus;

FIG. 20 is a flowchart of the image display process of the electronic notebook with the second switching apparatus;

FIG. 21 is a timing chart illustrating by way of example an infrared light emitting timing and an infrared light receiving timing when a non-contact operation medium is moved in the image display mode of the electronic notebook with the second switching apparatus.

FIG. 22 is a view illustrating a character displayed when the non-contact operation performed at a moving rapidity of not less than 2.0 m/s in the image display mode of the electronic note book with the second switching apparatus.

In the general process of FIG. 8, operation of the mode key 32b of the key input unit 32 sets a value "1" to the mode flag register N of the RAM 36 (FIG. 17) and further sets a value "0" to the ROM address register M of FIG. 16 (steps T1 to T4 of FIG. 8). Then, the CPU 31 is set to the image display mode and executes processes in the image display mode in accordance with the flowchart of FIG. 18 (step TB of FIG. 8).

In the image display mode, when the start key 32c is not operated, the CPU 31 start executing image displaying process (steps E1, EC of FIG. 18).

Since the ROM address register M of the RAM 36 (FIG. 17) has been set to "0" at step T4 of FIG. 8, one set Of character data (1), (2) corresponding to the ROM address "M=0" are read out to the CPU 31 from the ROM 33. More specifically, the character data (1) of the kennel and the character data of the character (a dog coming out from the kennel) are read out and are alternatively displayed on the display unit 38 each for one second as shown in FIG. 13 (steps H1, H2 of FIG. 20).

Meanwhile, operation of the start key 32c of the key input unit 32 makes the light emitting element 34b of the signal transmitting unit 34 to emit the infrared light, and resets the counter 36e of the RAM 36 to start the counting operation (steps E1, E2, E3 of FIG. 18).

If the user does not perform non contact operation in front of the signal transmitting unit 34 and the signal receiving unit 35, and the light receiving element 35b of the signal receiving unit 35 receives no reflected infrared light for a predetermined period, the signal transmitting unit 34 emits the infrared light again, and the counter 36e of the RAM 36 is reset and starts the counting operation again (steps E4, E5, E2 and E3).

When the user puts his hand in front of the light emitting element 34b and the light receiving element 35b as shown in FIG. 21 while the signal transmitting unit 34 repeatedly emits the infrared light, the infrared light emitted from the light emitting element 34b is reflected on the user's hand and is received by the light receiving element 35b. Then, the counter 36e stops the counting operation (steps E2, E3, E4, E6).

The counter 36e obtains a counter value A corresponding to an initial time that the infrared light emitted from the signal transmitting unit 34 takes to be reflected on the user's hand and to be received by the signal receiving unit 35. The counter value (A) corresponding to an initial position of the non contact operation or corresponding to a motion starting position from which the user's hand is moved, as illustrated by a broken line (i) in FIG. 22, is written in the counter registers A and C. The light receiving flag register H is set to a values "1" (steps E7, E8 and E9).

While the user's hand is kept at the initial position shown by the broken line (i), the counter 36e obtains the same counter value (A) through the processes (steps B2 to B6). When it is determined that the light receiving flag register H is not set to "0" (step E7), the current counter value (A) is compared with the counter value written in the counter register C (step E10).

It is judged whether the counter value written in the counter register C coincides with the current counter value (A) obtained by the counter 36e. Since both the counter value in the counter register C and the current counter value (A) obtained by the counter 36e are obtained while the user's hand kept at the initial position shown by the broken line (i), it is determined that the both counter values to be compared coincide with each other, that is, it is determined that the user's hand is not moved. The movement detecting flag register G is set to "0", and the signal transmitting process of the infrared light is executed again and the counter 36e is reset and starts the counting operation (steps E10, E11, E2 and E3).

With the user's hand kept still at the initial position (i), the processes at steps E2 to E4, E6, E7, E10, E11) are repeatedly executed.

When the user's hand is moved from the initial position (i) towards the light emitting element 34b and the light receiving element 35 as shown by a broken line arrow (j) in FIG. 22, the counter values (a), (B), (C), (D), which are successively obtained by the counter 36e are decreased as shown in FIG. 21. When a counter value written in the counter register C, for example, the counter value (A), is compared with a current counter value obtained by the counter 36e, for example, the counter value (B), it is determined that the compared counter values (A) and (B) do not coincided with each other, that is, it is determined that the user has moved his hand. Then, the counter value (B) is written in the counter register C, the movement detecting flag register G is set to "1", and the time register 36d starts a time counting operation to count a time lapse from the start of the non contact operation (steps E2 to E4, E6, E7, E10, E12, E13 and E14).

Thereafter, when the user's hand is kept moving towards the light emitting element 34b and the light receiving element 35b, the counter values (B), (C) and (D) are successively written in the counter register C, and the processes at steps E2 to E4, E6, E7, E10, E12, and E13 are repeatedly executed.

When the user's hand stops at a position in the vicinity of the light emitting element 34b and the light receiving element 35b, shown by a line (k) in FIG. 22, the counter value (D) obtained by the counter 36e at step E6 is written in the counter register C again at step E12. Therefore, it is determined that the counter values coincide with each other at step E10, and further, it is determined that the movement detecting flag register G has been set to "1". Then, the counter value (D) is written in counter register B, which value (D) corresponds to a final position of the non contact operation, i.e., corresponds to a motion stopping position where the user's hand is brought and kept still (steps E10, E11 and E15).

In other words, at the step of E15, in the counter register A of the RAM 36 of FIG. 17 has been written the counter value (A) corresponding to the motion starting position (i) of the non contact operation and in the counter register B of the RAM 36 has been written the counter value (D) corresponding to the motion stopping position (k) of the non contact operation. Then, the movement detecting flag register G is set to "0", and the time register 36d stops the time counting operation of the time lapse from the start of the non contact operation. Further, a difference in counter values (A) and (D) is calculated, which difference corresponds to a distance over which the non contact operation is performed, or a distance over which the user moves his hand (steps E16, E17).

Based on the difference in the counter values, (A)–(D), calculated at step E17, the CPU 31 reads out the distance from the counter/distance converting table 33a of the RAM 33, over which distance the user moves his hand with reference to the light emitting element 34b and the light receiving element 35b (step E18).

Then, the moving rapidity of the non contact operation is calculated from the distance read out from the counter/distance converting table 33a of the ROM 33 and the time lapse counted by the timer register 36d (step E19).

The timer register 36d is cleared and a setting operation of the ROM address M (FIG. 19) is performed based on the calculated rapidity of the non contact operation (steps E20, ED).

In the setting operation of the ROM address M of FIG. 19, if it is determined that the rapidity of the non contact operation calculated by the CPU 31 at step B19 is not less than 2.1 m/s (refer to FIG. 22), the ROM address register M of the RAM 36 is set to "1" at step D6, and the image display operation will be performed in accordance with the ROM address "M=1" (steps ED, "D5–D6", EC).

More specifically, in the image display operation of FIG. 20, the CPU 31 successively reads out from the ROM 33 one set of character data (1) to (11) (FIG. 16) corresponding to the renewed ROM address "M=1", and displays the read out character data on the display unit 38 (steps H3, H4 of FIG. 20). In other words, in place of the character data (1), (2) corresponding to the ROM address "M=0" shown in FIG. 13, the character data (1) to (11) representing a dog that fetches a bar thrown to a distance by a girl are successively displayed like animation on the display unit 38 as shown in FIG. 22.

In the setting operation of the ROM address M of FIG. 19, if it is determined that the rapidity of the non contact operation calculated by the CPU 31 at step E19 falls within a range of 1.6–2.0 m/s, the ROM address register M of the RAM 36 is set to "2" at step D6, and the image display operation will be performed in accordance with the ROM address "M=2" (steps ED, "D3–D4", EC).

More specifically, in the image display operation of FIG. 20, the CPU 31 successively reads out from the ROM 33 one set of character data (1) to (9) (FIG. 16) corresponding to the renewed ROM address "M=2", and displays the read out character data on the display unit 38 (steps H5, H6). In other words, in place of the character data (1), (2) corresponding to the ROM address "M=0" shown in FIG. 13, the character data (1) to (9) representing a dog that fetches a bar thrown to a middle distance by a girl are successively displayed like animation on the display unit 38.

In the setting operation of the ROM address M of FIG. 19, if it is determined that the rapidity of the non contact operation calculated by the CPU 31 at step E19 falls within a range of 1.0–1.5 m/s, the ROM address register M of the RAM 36 of FIG. 17 is set to "3" at step D2, and the image display operation will be performed in accordance with the ROM address "M=3" (steps ED, "D1–D2", EC).

More specifically, in the image display operation of FIG. 20, the CPU 31 successively reads out from the ROM 33 one set of character data (1) to (7) (FIG. 16) corresponding to the renewed ROM address "M=3", and displays the read out character data on the display unit 38 (steps H5, H7). In other words, in place of the character data (1), (2) corresponding to the ROM address "M=0" shown in FIG. 13, the character data (1) to (7) representing a dog that fetches a bar thrown to a near distance by a girl are successively displayed like animation on the display unit 38.

In the electronic notebook with the second switching apparatus, the user's hand put apart from the light emitting element 34b and the light receiving element 35b provided in the electronic notebook body reflects the infrared light emitted from the light emitting element 34b and the reflected infrared light is received by the light receiving element 35b. The rapidity of the non contact operation is calculated from the distance between the motion starting position and the motion stopping position and the time lapse counted by the timer register 36d. Based on the rapidity of the non contacting operation, a value of the ROM address register M is selectively set. The CPU 31 reads out from the ROM 33 of FIG. 16 plural character (dog) data corresponding to the value of the ROM address register M and displays on the display unit 38 the read out character data representing various views of a dog such as the dog fetching a bar thrown by a girl. In conventional image display apparatus, the user has to operate keys to enter an instruction. The present electronic notebook, however, does not require the user to execute mechanical operation such as key operation to input an instruction. Moving his hand at various moving speeds in front of the electronic notebook body, the user can make the electronic notebook selectively display dogs fetching a bar thrown to various distances.

In the above embodiments, the infrared light is emitted from the electronic notebook body and the infrared light reflected on the user's hand is detected. To judge gestures made by the user in the vicinity of the electronic notebook to determine what instruction or intention of the user is entered, it may be detected whether a light externally transmitted to the electronic notebook is interrupted by the user's hand, whether a sonic wave emitted from the notebook body is reflected on the user's hand, whether a sonic wave transmitted to the electronic notebook is interrupted by the user's hand, or change in a magnetic field caused by a magnet in the user's hand. Then, images displayed on the display unit may be switched depending on the instruction or intention determined in the above mentioned manner.

A change in waveform of an infrared light and a sonic wave, or a change in a magnetic field may be detected to determine a moving distance over which the user's operation is executed or rapidity of the user's motion. Images displayed on the display unit may be switched depending on the change detected in the above manner.

In the above embodiments, the image displayed on the display unit is switched depending on the user's non contact operation, but other control process such as switching a mechanical operation may be executed by the user's non contact operation.

What is claimed is:

1. A switching apparatus for controlling a mechanism, comprising:

driving means for driving said mechanism;

non-contact switching means for performing a switching operation in response to non-contact motion of a user;

position detecting means for obtaining position data from a state of the switching operation of said non-contact switching means, the position data representing a position of the non contact motion by the user relative to said non-contact switching means; and control means for controlling said driving means to drive said mechanism based on the position data obtained by said position detecting means, wherein said non-contact switching means includes:

signal transmitting means for transmitting an infrared light signal;

signal receiving means for receiving the infrared light signal of said signal transmitting means reflected in response to the non contact motion made by the user; and switching means for performing switching operation when said signal receiving means receives the reflected infrared light signal, and wherein said position detecting means includes:

time counting means for counting a time lapse from a time when said signal transmitting means transmits an infrared light signal to a time when said signal receiving means receives the infrared light signal of said signal transmitting means reflected in response to the non contact motion made by the user, and for obtaining position data from the counted time lapse.

2. A switching apparatus according to claim 1, wherein said mechanism is mounted on a robot of a human shape.

3. A switching apparatus controlled with a non contact medium operated by a user, comprising:

image-data storing means for storing a plurality of image data;

non-contact switching means for executing a switching operation in response to the non contact medium operated by the user;

position detecting means for obtaining position data based on the switching operation executed by said non-contact switching means, the position data representing a position of the non contact medium operated by the user relative to said non-contact switching means;

image-data selecting means for selecting at least one image data from among the plurality of image data stored in said image-data storing means, depending on the position data obtained by said position detecting means; and display means for displaying the image data selected by said image-data selecting means.

4. A switching means according to claim 3, wherein said image-data storing means stores a plurality of image data, each image data representing a view of an animal.

5. A switching apparatus according to claim 3, wherein said non-contact switching means comprises:

signal transmitting means for transmitting an infrared light signal;

signal receiving means for receiving the infrared light signal of said signal transmitting means reflected from the non contact medium operated by the user; and switching means for performing a switching operation when said signal receiving means receives the reflected infrared light signal.

6. A switching apparatus according to claim 5, wherein said position detecting means comprises:

time counting means for counting a time lapse from a time when said signal transmitting means transmits an infrared light signal to a time when said signal receiving means receives the infrared light signal of said signal transmitting means reflected from the non contact medium operated by the user, and for obtaining position data from the counted time lapse.

7. A switching apparatus according to claim 5, wherein said position detecting means comprises:

time counting means for counting a time lapse from a time when said signal transmitting means transmits an infrared light signal to a time when said signal receiving means receives the infrared light signal of said signal transmitting means reflected from the non contact medium operated by the user; and distance detecting means for obtaining position data from the time lapse counted by said time counting means, the position data representing a distance between said non contact switching means and a position of the non contact medium operated by the user.

8. A switching apparatus comprising:

data storing means for storing a plurality of image data and a plurality of sound data, the plurality of sound data corresponding respectively to the plurality of image data;

non-contact switching means for executing a switching operation in response to non contact motion made by a user;

position detecting means for obtaining position data representing a position where the non contact motion is performed by the user, based on the switching operation executed by said non-contact switching means;

image-data selecting means for selecting at least one image data from among the plurality of image data stored in said data storing means depending on the position data obtained by said position detecting means;

display means for displaying the image data selected by said image-data selecting means; and sound generating means for generating a sound based on sound data stored in said data storing means and corresponding to the image data selected by said image-data selecting means, when the selected image data is displayed on said display means.

9. A switching means according to claim 8, wherein said image-data storing means stores a plurality of image data, each image data representing a view of an animal, a plurality of sound data, each sound data for generating a voice of the animal.

10. A switching apparatus according to claim 8, wherein said non-contact switching means comprises:

signal transmitting means for transmitting an infrared light signal;

signal receiving means for receiving the infrared light signal of said signal transmitting means reflected in response to the non contact motion made by the user; and switching means for performing a switching operation when said signal receiving means receives the reflected infrared light signal.

11. A switching apparatus according to claim 8, wherein said position detecting means comprises:

time counting means for counting a time lapse from a time when said signal transmitting means transmits an infrared light signal to a time when said signal receiving means receives the infrared light signal of said signal transmitting means reflected in response to the non contact motion made by the user, and for obtaining position data from the counted time lapse.

12. A switching apparatus according to claim 8, wherein said position detecting means comprises:

time counting means for counting a time lapse from a time when said signal transmitting means transmits an infrared light signal to a time when said signal receiving means receives the infrared light signal of said signal transmitting means reflected in response to the non contact motion made by the user; and distance detecting means for obtaining position data from the time lapse counted by said time counting means, the position data representing a distance between said non contact switching means and a position of the non contact motion made by the user.

13. An image displaying apparatus controlled with a non contact medium operated by a user, comprising:

image-data storing means for storing a plurality of image data;

signal transmitting means for transmitting an infrared light signal;

signal receiving means for receiving the infrared light signal of said signal transmitting means reflected from the non contact medium operated by the user;

first time counting means for periodically counting a time lapse from a time when said signal transmitting means transmits an infrared light signal to a time when said signal receiving means receives the infrared light signal which is transmitted from said first signal transmitting means and is reflected from the non contact medium operated by the user;

comparing means for comparing a time lapse counted last by said time counting means with a time lapse previously counted by said first time counting means to judge whether both the time lapses to be compared coincide with each other;

second time counting means for counting a time difference between a time lapse counted first by said fist time counting means and the time lapse counted last by said first time counting means, when said comparing means determines that the compared time lapses coincide with each other;

image-data selecting means for selecting at least one image data from among the plurality of image data stored in said image-data storing means, depending on the time difference calculated by said second time calculating means; and, display means for displaying the image data selected by said image-data selecting means.

14. An image displaying apparatus controlled with a non contact medium operated by a user, comprising:

image-data storing means for storing a plurality of image data;

signal transmitting means for transmitting an infrared light signal;

signal receiving means for receiving the infrared light signal of said signal transmitting means reflected from the non contact medium operated by the user;

first time counting means for periodically counting a time lapse from a time when said signal transmitting means transmits an infrared light signal to a time when said signal receiving means receives the infrared light signal which is transmitted from said signal transmitting means and is reflected from the non contact medium operated by the user;

comparing means for comparing a time lapse counted last by said time counting means with a time lapse previously counted by said first time counting means to judge whether both the time lapses to be compared coincide with each other;

second time counting means for counting a time difference between a time lapse counted first by said fist time counting means and the time lapse counted last by said first time counting means, when said comparing means determines that the compared time lapses coincide with each other;

distance calculating means for calculating from the time difference counted by said second time counting means a distance along which the non contact medium is operated by the user;

rapidity calculating means for calculating rapidity of the non contact medium operated by the user from the time difference counted by said second time counting means and the distance calculated by said distance calculating means;

image-data selecting means for selecting at least one image data from among the plurality of image data stored in said image-data storing means, depending on the rapidity of the non contact medium calculated by said rapidity calculating means; and display means for displaying the image data selected by said image-data selecting means.

15. An image displaying apparatus comprising:

image-data storing means for storing a plurality of image data;

signal transmitting means for transmitting an infrared light signal;

signal receiving means for receiving the infrared light signal of said signal transmitting means reflected in response to a non contact motion made by a user;

first time counting means for periodically counting a time lapse from a time when said signal transmitting means transmits an infrared light signal to a time when said signal receiving means receives the infrared light signal which is transmitted from said first signal transmitting means and is reflected in response to the non contact motion operated by the user;

comparing means for comparing a time lapse counted last by said time counting means with a time lapse previously counted by said first time counting means to judge whether both the time lapses to be compared coincide with each other;

second time counting means for counting a time difference between a time lapse counted first by said fist time counting means and the time lapse counted last by said first time counting means, when said comparing means determines that the compared time lapses coincide with each other;

image-data selecting means for selecting at least one image data from among the plurality of image data stored in said image-data storing means, depending on the time difference calculated by said second time calculating means; and, display means for displaying the image data selected by said image-data selecting means.

16. An image displaying apparatus comprising:

image-data storing means for storing a plurality of image data;

signal transmitting means for transmitting an infrared light signal;

signal receiving means for receiving the infrared light signal of said signal transmitting means reflected in response to a non contact motion made by a user;

first time counting means for periodically counting a time lapse from a time when said signal transmitting means transmits an infrared light signal to a time when said signal receiving means receives the infrared light signal which is transmitted from said signal transmitting means and is reflected from the non contact motion made by the user;

comparing means for comparing a time lapse counted last by said time counting means with a time lapse previously counted by said first time counting means to judge whether both the time lapses to be compared coincide with each other;

second time counting means for counting a time difference between a time lapse counted first by said fist time counting means and the time lapse counted last by said first time counting means, when said comparing means determines that the compared time lapses coincide with each other;

distance calculating means for calculating from the time difference counted by said second time counting means a distance along which the non contact motion is made by the user;

rapidity calculating means for calculating rapidity of the non contact motion made by the user from the time difference counted by said second time counting means and the distance calculated by said distance calculating means;

image-data selecting means for selecting at least one image data from among the plurality of image data stored in said image-data storing means, depending on the rapidity of the non contact motion of the user calculated by said rapidity calculating means; and display means for displaying the image data selected by said image-data selecting means.

* * * * *